United States Patent
Matsuzaki et al.

(10) Patent No.: US 11,416,883 B2
(45) Date of Patent: Aug. 16, 2022

(54) INFORMATION PROCESSING SYSTEM, NON-TRANSITORY COMPUTER-READABLE STORAGE MEDIUM HAVING STORED INFORMATION PROCESSING PROGRAM THEREIN, INFORMATION PROCESSING APPARATUS, AND INFORMATION PROCESSING METHOD

(71) Applicant: NINTENDO CO., LTD., Kyoto (JP)

(72) Inventors: Tetsuro Matsuzaki, Kyoto (JP); Toshitaka Muramatsu, Kyoto (JP); Kei Matsubara, Kyoto (JP); Keisuke Ohtani, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/396,883

(22) Filed: Aug. 9, 2021

(65) Prior Publication Data
US 2022/0067771 A1 Mar. 3, 2022

(30) Foreign Application Priority Data
Sep. 2, 2020 (JP) .............................. JP2020-147680

(51) Int. Cl.
*G06Q 30/00* (2012.01)
*G06Q 30/02* (2012.01)
*G05B 19/418* (2006.01)

(52) U.S. Cl.
CPC .............................. *G06Q 30/0209* (2013.01)

(58) Field of Classification Search
CPC .................................................. G06Q 30/0209
See application file for complete search history.

(56) References Cited

U.S. PATENT DOCUMENTS

2018/0096317 A1* 4/2018 Oochi ................. G07F 17/3255
2018/0165701 A1* 6/2018 Onda ....................... A63F 13/79

FOREIGN PATENT DOCUMENTS

WO WO-2016093923 A1 * 6/2016 ........... A63F 13/352

OTHER PUBLICATIONS

-Gamification in Enterprise Information Systems What, why and how. IEEE. 2016. (Year: 2016).*
- "Sensing processes participation game of smartphones in participatory sensing systems". IEEE. 2014. (Year: 2014).*
ONLINE—https://web.archive.org/web/20201026132648/https://guide.fire-emblem-heroes.com/en-US/eve003/, printed Aug. 6, 2021, 7 pages.
ONLINE—https://new-guide.fire-emblem-heroes.com/en-US/feh-2170.html, printed Aug. 6, 2021, 5 pages.

* cited by examiner

*Primary Examiner* — Maria V Vanderhorst
(74) *Attorney, Agent, or Firm* — Nixon & Vanderhye P.C.

(57) ABSTRACT

Information about a plurality of participation rewards to be given upon participation in a game event during each unit period in a period in which the event is held, is presented to a user. An upper limit number of unit periods for giving, and the reward contents, are set in advance. In accordance with event participation, participation rewards corresponding to the unit periods in which the participation timings are included are given to the user. The event advancement status is updated on the basis of the event participation by each user. If an ending condition is satisfied, event advancement is ended. If the number of times the unit period has come until the end of the event since the start thereof is smaller than the upper limit number of unit periods in which the rewards can be given, at least one of non-given participation rewards is given to the user.

15 Claims, 17 Drawing Sheets

Fig. 6

| DAY NUMBER | UNIT PERIOD | NUMBER OF REMAINING DAYS | COMPENSATION TARGET REWARD |
|---|---|---|---|
| 1ST DAY | 8/1 0:00:00〜23:59:59 | 9 | FOR SECOND TO FIFTH TIMES |
| 2ND DAY | 8/2 0:00:00〜23:59:59 | 8 | FOR THIRD TO FIFTH TIMES |
| 3RD DAY | 8/3 0:00:00〜23:59:59 | 7 | FOR FOURTH AND FIFTH TIMES |
| 4TH DAY | 8/4 0:00:00〜23:59:59 | 6 | FOR FIFTH TIME |
| 5TH DAY | 8/5 0:00:00〜23:59:59 | 5 | NONE |
| 6TH DAY | 8/6 0:00:00〜23:59:59 | 4 | NONE |
| 7TH DAY | 8/7 0:00:00〜23:59:59 | 3 | NONE |
| 8TH DAY | 8/8 0:00:00〜23:59:59 | 2 | NONE |
| 9TH DAY | 8/9 0:00:00〜23:59:59 | 1 | NONE |
| 10TH DAY | 8/10 0:00:00〜23:59:59 | 0 | NONE |

Fig. 7

| | CASE OF EARLY DEFEAT (e.g., DEFEAT ON 3RD DAY) | CASE OF NOT EARLY DEFEAT (e.g., DEFEAT ON 7TH DAY) |
|---|---|---|
| USER A (PARTICIPATED ON ONLY 1ST DAY) | FOR FIRST, FOURTH AND FIFTH TIMES | FOR ONLY FIRST TIME |
| USER B (PARTICIPATED ON ONLY 1ST AND 3RD DAYS) | FOR FIRST, SECOND, FOURTH AND FIFTH TIMES | FOR FIRST AND SECOND TIMES |
| USER C (PARTICIPATED EVERY DAY UNTIL DEFEAT) | FOR ALL OF FIRST TO FIFTH TIMES | FOR ALL OF FIRST TO FIFTH TIMES |
| USER D (NOT PARTICIPATED) | FOR FOURTH AND FIFTH TIMES | NO PARTICIPATION REWARDS |

| EVENT ID 421 | HOLDING STATUS 422 | HOLDING SCHEDULE INFORMATION 423 | PARTICIPATION REWARD INFORMATION 424 | INITIAL HP 425 | PRESENT HP 426 |
|---|---|---|---|---|---|
| 0001 | ENDED | 7/1 0:00:00 ~ 7/10 23:59:59 | ... | 1000000 | 0 |
| 0002 | BEING HELD | 8/1 0:00:00 ~ 8/10 23:59:59 | ... | 3000000 | 2986543 |
| 0003 | BEFORE STARTED | 9/1 0:00:00 ~ 9/10 23:59:59 | ... | 3000000 | 3000000 |
| 0004 | BEFORE STARTED | 10/1 0:00:00 ~ 10/10 23:59:59 | ... | 4000000 | 4000000 |
| ... | ... | ... | ... | ... | ... |

424

| GIVING COUNT NUMBER | REWARD CONTENT |
|---|---|
| FIRST-TIME REWARD | ITEM A × 3 |
| SECOND-TIME REWARD | ITEM B × 5 |
| THIRD-TIME REWARD | ITEM C × 1 |
| FOURTH-TIME REWARD | ITEM D × 5 |
| FIFTH-TIME REWARD | ITEM E × 10 |

Fig. 17

| DAY NUMBER | UNIT PERIOD | PROGRESS COUNTER VALUE | NUMBER OF REMAINING DAYS |
|---|---|---|---|
| 1ST DAY | 8/1 0:00:00~23:59:59 | 1 | 9 |
| 2ND DAY | 8/2 0:00:00~23:59:59 | 2 | 8 |
| 3RD DAY | 8/3 0:00:00~23:59:59 | 3 | 7 |
| 4TH DAY | 8/4 0:00:00~23:59:59 | 4 | 6 |
| 5TH DAY | 8/5 0:00:00~23:59:59 | 5 | 5 |
| 6TH DAY | 8/6 0:00:00~23:59:59 | 6 | 4 |
| 7TH DAY | 8/7 0:00:00~23:59:59 | 7 | 3 |
| 8TH DAY | 8/8 0:00:00~23:59:59 | 8 | 2 |
| 9TH DAY | 8/9 0:00:00~23:59:59 | 9 | 1 |
| 10TH DAY | 8/10 0:00:00~23:59:59 | 10 | 0 |

INFORMATION PROCESSING SYSTEM, NON-TRANSITORY COMPUTER-READABLE STORAGE MEDIUM HAVING STORED INFORMATION PROCESSING PROGRAM THEREIN, INFORMATION PROCESSING APPARATUS, AND INFORMATION PROCESSING METHOD

CROSS REFERENCE TO RELATED APPLICATION

This application claims priority to Japanese Patent Application No. 2020-147680 filed on Sep. 2, 2020, the entire contents of which are incorporated herein by reference.

FIELD

The exemplary embodiments relate to information processing for providing a user with a game event that can be held over a plurality of unit periods, and more specifically, relate to processing for giving a reward of the game event to a user.

BACKGROUND AND SUMMARY

Conventionally, there has been known a game in which an in-game event for a limited time only is held. Among such games, there has been known a game in which an event participation reward is given to a user once a day.

In a game as described above, the holding period of the event is generally set in advance, and it can be said that the user is provided with an occasion to participate in the event until the scheduled ending date of the holding period. Therefore, in such a game, a case where the event is ended early has not been particularly taken into consideration.

Here, if the event has ended early, some of participation rewards planned to be given to users end up having no occasion to be given to users and thus there is a possibility of leading to a result contrary to the user's expectation. In particular, a user who is going to participate in the event every day might originally expect to be given all the participation rewards. However, the user loses an occasion to participate in the event because of the early ending, and thus loses an occasion to obtain some of the participation rewards, leading to a result contrary to the user's expectation. Thus, there is room for improvement from the standpoint of preventing loss of the user's expectation as described above.

Accordingly, an object of the exemplary embodiments is to provide an information processing system, a non-transitory computer-readable storage medium having an information processing program stored therein, an information processing apparatus, and an information processing method that prevent loss of user's expectation for a reward planned to be given, even if the event has ended early.

Configuration examples for achieving the above objects will be shown below.

One configuration example is an information processing system for providing a user with a game event which can be held over a plurality of unit periods, the information processing system performing updating, presenting, first giving, ending, and second giving. In the updating, an advancement status of the game event is updated on the basis of participation in the game event by the user or another user different from the user. In the presenting, information about a plurality of participation rewards is presented to the user, the plurality of participation rewards being rewards to be given upon participation in the game event during each of the unit periods in a period in which the game event is held, the plurality of participation rewards being rewards of which reward contents for at least two unit periods defined for a predetermined number of times in advance are set in advance irrespective of the advancement status. In the first giving, in accordance with participation in the game event by the user, the user is given the participation reward associated with the unit period in which a timing of the participation is included. In the ending, advancement of the game event is ended if the advancement status of the game event satisfies an ending condition. In the second giving, if a number of times the unit period has come until the advancement status of the game event satisfies the ending condition since start of the game event is smaller than the predetermined number of times, the user is given at least one of non-given rewards which are participation rewards having not been given to the user among the plurality of participation rewards.

According to the above configuration example, in a case where the event has ended with a period shorter than the originally scheduled holding period and in fewer days than the upper limit number of times for giving the rewards, at least one of rewards that have not been given among the presented rewards can be given to the user. Thus, it is possible to prevent loss of expectation that the user has through presentation of rewards beforehand, and prevent loss of motivation to participate in the event. Therefore, also for the event that can be ended early, a user's motivation to participate in this event can be maintained.

In another configuration example, in the second giving, the user is given the non-given rewards whose number is equal to a number by which the number of times the unit period has come until the advancement status satisfies the ending condition is smaller than the predetermined number of times.

According to the above configuration example, in a case where the event has ended early, the user is given the rewards whose number is equal to a number by which the number of times the unit period has come is smaller than the upper limit number of times for giving the rewards. Thus, it is possible to prevent loss of expectation of the user who has expected to be given the rewards.

In another configuration example, in the second giving, the user may be given, among the non-given rewards, only the participation rewards that could not be given to the user even if the user participated for all the unit periods until the game event is ended.

According to the above configuration example, in a case where the event has ended early, the rewards for which all the users have lost occasions to be given them can be given to the users. Thus, fairness among the users can be kept. That is, in the unit periods in which the rewards can be given, occasions for giving the rewards are equally provided to all the users, and whether or not to participate is up to each user's discretion or the like. Therefore, in such periods, the difference between a case where the reward is given and a case where the reward is not given is not considered unfair. On the other hand, in a case where the event has ended while the number of times the unit period has come is smaller than the upper limit number of times for giving the rewards, the rewards for the times corresponding to shortfall as compared to the upper limit number of times would be never given even if the user has participated every day until the end of the event. Therefore, if only the rewards for which all the users have lost occasions to be given them are given to the users, it is possible to prevent loss of fairness among the users.

In another configuration example, in the second giving, at least one of the non-given rewards may be given also to the user who uses an application in which the game event can be performed, and who has never participated in the game event during the holding period of the game event.

According to the above configuration example, even if a user has not participated in the event until the early end of the event, it can be said that, if the event did not end early, the user might participate in the event thereafter. Therefore, if some non-given rewards are given also to the user who has not participated in the event until the early end of the event, the user's expectation and fairness among the users can be kept.

In another configuration example, when the user has participated in the game event, the user may be given the participation rewards associated with the unit periods and determined on the basis of a number of the unit periods for which the user has ever participated in the game event during the holding period of the game event.

According to the above configuration example, on a user-by-user basis, the number of days on which each user has participated can be counted and the participation rewards for the user can be determined. Thus, it is possible to give the participation rewards in accordance with the number of times each user has actually participated in the event. In this way, it is possible to provide motivation to continue to participate in the event.

Another configuration example is an information processing system for providing a user with a game event which can be held over a plurality of unit periods, the information processing system performing updating, presenting, first giving, ending, and second giving. In the updating, an advancement status of the game event is given on the basis of participation in the game event by the user or another user different from the user. In the presenting, information about a plurality of participation rewards is presented to the user, the plurality of participation rewards being rewards to be given upon participation in the game event during each of the unit periods in a period in which the game event is held, the plurality of participation rewards being rewards for which reward contents are set in advance irrespective of the advancement status and an upper limit unit period number is set, the upper limit unit period number being a number of at least two unit periods in which the participation rewards can be given in an entirety of the period in which the game event is held. In the first giving, in accordance with participation in the game event by the user, the user is given the participation reward associated with the unit period in which a timing of the participation is included. In the ending, advancement of the game event is ended if the advancement status of the game event satisfies an ending condition. In the second giving, if a number of times the unit period has come until the advancement status of the game event satisfies the ending condition since start of the game event is smaller than the upper limit unit period number, the user is given at least one of non-given rewards which are participation rewards having not been given to the user among the plurality of participation rewards.

According to the above configuration example, in a case where the event has ended with a period shorter than the originally scheduled holding period and in fewer days than the upper limit number of times for giving the rewards, at least one of rewards that have not been given among the presented rewards can be given to the user. Thus, it is possible to prevent loss of expectation that the user has through presentation of rewards beforehand, and prevent loss of motivation to participate in the event.

According to the exemplary embodiments, expectation imparted to the user through presentation of participation rewards can be prevented from being lost because of early end of the event, and also loss of motivation to participate in the event can be prevented.

BRIEF DESCRIPTION OF THE DRAWINGS

FIG. 6 illustrates a non-limiting example for giving participation rewards;

FIG. 7 illustrates a non-limiting example for giving participation rewards;

FIG. 10 shows a non-limiting example of the data structure of event data 404;

FIG. 17 shows a non-limiting example of the relationship of the value of an event progress counter 406 and the number of remaining days;

DETAILED DESCRIPTION OF NON-LIMITING EXAMPLE EMBODIMENTS

Figure 1:
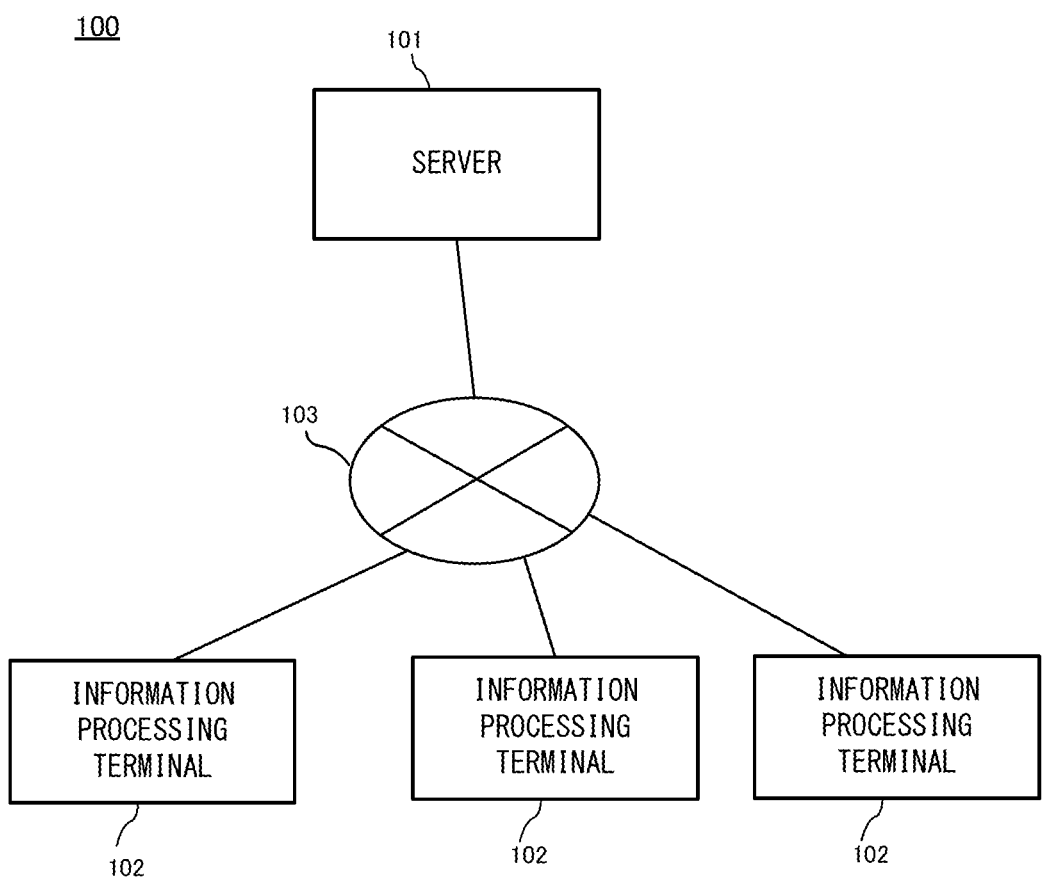
FIG. 1 is a schematic diagram showing a non-limiting example of the entire configuration of an information processing system according to one exemplary embodiment.

Hereinafter, one exemplary embodiment will be described. It is to be understood that, as used herein, elements and the like written in a singular form with a word "a" or "an" attached before them do not exclude those in the plural form. FIG. 1 is a schematic diagram illustrating a non-limiting example of the entire configuration of an information processing system according to the exemplary embodiment. An information processing system 100 of the exemplary embodiment includes a server 101 and a plurality of information processing terminals 102. The server 101 and each information processing terminal 102 are configured to be able to communicate with each other via the Internet 103. In the exemplary embodiment, with such a configuration, information processing is executed. Hereinafter, a description will be given with game processing as an example of the information processing. Specifically, it is assumed as an example that a game application is installed on the information processing terminal 102 and the game processing is executed while the information processing terminal 102 is communicating with the server 101 as necessary.

[Hardware Configuration of Server]

Figure 2:
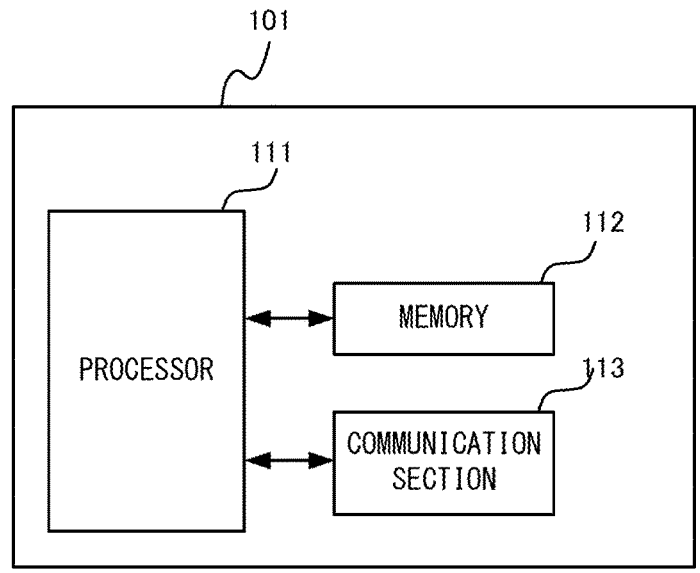
FIG. 2 is a block diagram showing a non-limiting example of the hardware configuration of a server 101.

Next, the hardware configuration of the server 101 will be described. FIG. 2 is a block diagram illustrating a non-limiting example of the hardware configuration of the server 101. The server 101 includes at least a processor 111, a memory 112, and a communication section 113. The processor 111 executes various programs for controlling the server 101. In the memory 112, various programs to be executed by the processor 111 and various kinds of data to be used by the processor 111 are stored. The communication section 113 connects to a network by means of wired or wireless communication and transmits/receives predetermined data to/from each information processing terminal 102 or another server (not shown).

[Hardware Configuration of Information Processing Terminal]

Figure 3:
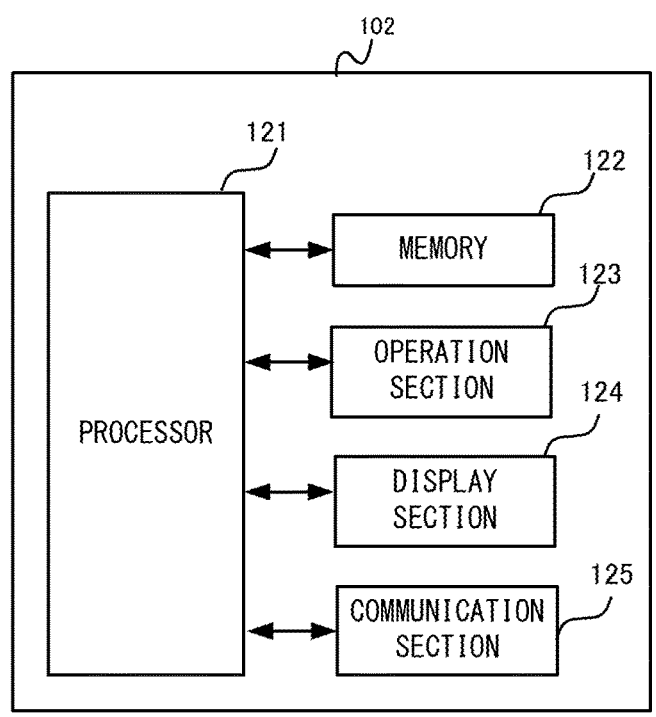
FIG. 3 is a block diagram showing a non-limiting example of the hardware configuration of an information processing terminal 102.

FIG. 3 is a block diagram illustrating a non-limiting example of the hardware configuration of the information processing terminal 102 in which game processing according to the exemplary embodiment is executed. Here, in the exemplary embodiment, for example, a smart device such as a smartphone or a tablet, a game apparatus such as a stationary game apparatus or a hand-held game apparatus, a personal computer, or the like is assumed as the information processing terminal 102. In the description of the exemplary embodiment, an information processing terminal (for example, a smartphone) including a display screen and a touch panel that are integrated with each other will be described as an example. Therefore, input operations are mainly inputs to the touch panel. However, in another exemplary embodiment, for input operation, a physical controller connected to the information processing terminal 102 wirelessly or via wire may be employed, or for example, an input apparatus formed integrally with the information processing terminal 102 may be employed.

In FIG. 3, the information processing terminal 102 includes a processor 121, a memory 122, an operation section 123, a display section 124, and a communication section 125. The processor 121 executes later-described game processing or executes a system program (not shown) for controlling overall operation of the information processing terminal 102, thereby controlling operation of the information processing terminal 102. The processor 121 may include a single processor or a plurality of processors. In the memory 122, various programs to be executed by the processor 121 and various kinds of data to be used in the programs are stored. The memory 122 is, for example, a flash EEPROM or a hard disk device. The operation section 123 is an input device for receiving an operation from a user, and in the exemplary embodiment, a touch panel is mainly assumed as the operation section 123. In another exemplary embodiment, the operation section 123 may be various pointing devices, various press-type buttons, an analog stick, and the like. The display section 124 is typically a liquid crystal display device. The communication section 125 connects to the network via wired or wireless communication, to transmit/receive predetermined data to/from the server 101.

[Outline of Game Processing in Exemplary Embodiment]

Next, the outline of game processing executed in the exemplary embodiment will be described. The game processing assumed in the exemplary embodiment is processing relevant to an in-game event to be held in a predetermined game application, and more specifically, processing relevant to giving of a reward of the event.

The game application assumed in the exemplary embodiment may be any game as long as an in-game event as described later can be held in the game. The genre of the game application may be any genre, e.g., a role playing game, a simulation game, an action game, or a puzzle game. In the exemplary embodiment, a case of simulation role playing game (SRPG) will be described as an example. Each user can acquire a plurality of "characters" through a play of the SRPG. Then, in an in-game event as described below, the acquired characters can be used.

Next, the outline of an in-game event (hereinafter, simply referred to as an event) assumed in the exemplary embodiment will be described. This event is assumed to be a cooperative-type event in which a plurality of users participate and cooperate. For this event, for example, "one day" is defined as "unit period", and a predetermined holding period is set to include a plurality of unit periods, and the event is held over the plurality of unit periods. Hereinafter, the "plurality of unit periods" are referred to as an event holding period. In the exemplary embodiment, one day that is a period from 0:00:00 to 23:59:59 is used as an example of the unit period. In the exemplary embodiment, it is assumed that the event holding period is 10 days.

In the exemplary embodiment, it is assumed that a boss character called an "event boss" shared in common by participants appears in the event. The purpose of this event (event ending condition) is to make the hit points (HP) of the event boss 0 during the event holding period. Each user participating in the event causes the user's own character to attack the boss character. Thus, the event boss can be damaged and the HP of the event boss can be decreased. As described above, in this event, each user participating in the event attacks the event boss individually, to decrease the HP of the event boss shared in common by the participants. Then, if the HP becomes 0 during the event holding period, the goal of the event is achieved, and the event is ended at this time. In addition, the event is ended also in a case where 10 days which are the holding period have passed while the HP is still not 0.

The condition for ending the event is merely an example. In another exemplary embodiment, another condition is used as the event ending condition. For example, the ending condition may be that a predetermined number of predetermined boss characters are defeated.

Next, event advancement in the exemplary embodiment will be exemplified with reference to specific screen examples and operation examples. In the exemplary embodiment, first, the user can participate in the event by performing a predetermined "event participating operation". In the exemplary embodiment, the user can participate in the event a plurality of times in the unit period. In another exemplary embodiment, there may be a limitation on the number of times the user can participate in the event. For example, the user may be allowed to participate in the event only once a day.

Figure 4:
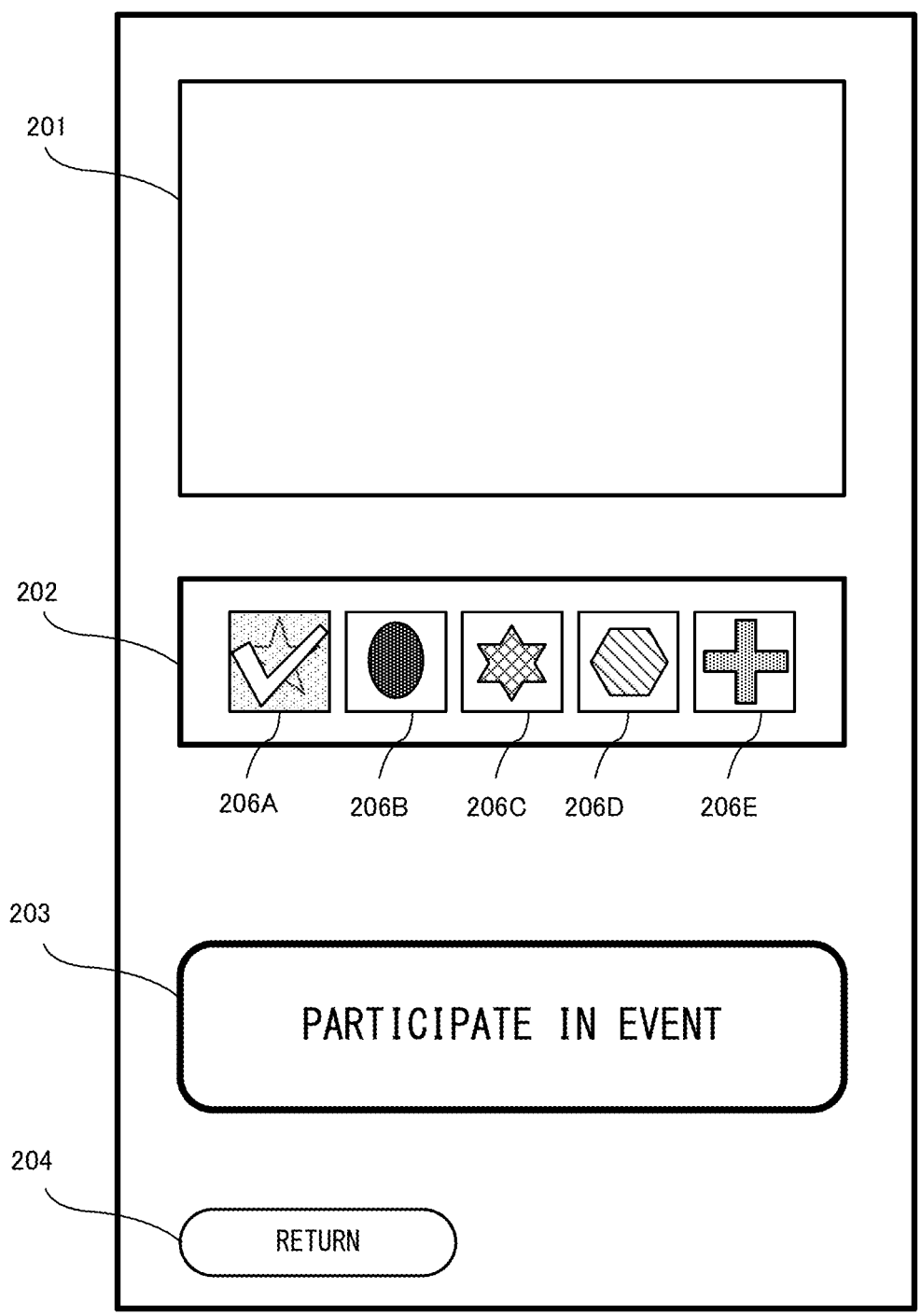
FIG. 4 shows a non-limiting example of a game screen.

As an example of the event participating operation, in the exemplary embodiment, a predetermined operation is performed on a game screen relevant to the event. FIG. 4 shows an example of a game screen (hereinafter, referred to as event screen) relevant to the event in the exemplary embodiment. The event screen in FIG. 4 is displayed in accordance with the user selecting an icon representing an "event" on a home screen of the game application, for example. In the screen example shown in FIG. 4, an event information indication area 201, a participation reward presentation area 202, a participation button 203, and a return button 204 are displayed.

In the event information indication area 201, various information about the event can be displayed. For example, an image of the event boss, an image of a character to be used in the event among characters that the player has, i.e., a character assigned for attacking the event boss, and the like can be displayed.

In the participation reward presentation area 202, an image indicating the contents of participation rewards is displayed. The participation rewards will be described later.

The participation button 203 is a button for participating in the event. Specifically, a tap operation on the participation button 203 corresponds to the event participating operation. In the exemplary embodiment, the event participating operation also serves as an operation for attacking the event boss. That is, the event participating operation includes an attack operation to the event boss. In addition, the event participating operation for one time corresponds to an attack for one time. Then, by performing the event participating operation a plurality of times a day, it is possible to attack the event boss a plurality of times. When the event participating operation is performed, a scene in which the character that the user has set in advance as an attack member for the event boss attacks the event boss, and a representation indicating the value of the dealt damage, are displayed. The exemplary embodiment shows the example in which the event participating operation serves also as an attack operation to the event boss, but in another exemplary embodiment, the event participating operation need not serve also as such an attack operation. For example, in response to the event participating operation, the screen may be shifted to a separately prepared game screen for attacking the event boss. For example, a game screen in which the event boss and the user's own character appear in a predetermined game field may be displayed. Then, on this screen, the user may operate the own character and select a desired attack method, to carry out an attack to the event boss.

Next, the return button 204 is a button for closing the event screen.

Next, the participation rewards indicated in the participation reward presentation area 202 will be described. In this event, a plurality of rewards called "participation rewards" are prepared for the purpose of promoting user's participation in the event, etc. The participation rewards can be used in the game application in which the event is held. In the exemplary embodiment, SRPG is used as an example, and therefore, for example, equipment items such as weapons and armors, consumable items such as recovery items, in-game currency, and the like that can be used in the game are prepared as the participation rewards. Besides, various characters and the like may be used as the participation rewards. Further, elements such as magic, skills, and special techniques, which can be learned by the player character so that the player character can advance the game advantageously, may be used as the participation rewards. Other than these, any elements that can be used in the game application in which the event is held may be used as the participation rewards.

In this event, the participation reward is set for each unit period. More specifically, the participation reward is given only once a day. In other words, in the exemplary embodiment, an upper limit is set on the number of times the participation reward is given in the unit period. In the exemplary embodiment, the example in which the participation reward is given once a day is shown, but without limitation thereto, in another exemplary embodiment, the participation reward may be given up to three times a day, for example.

Figure 5:
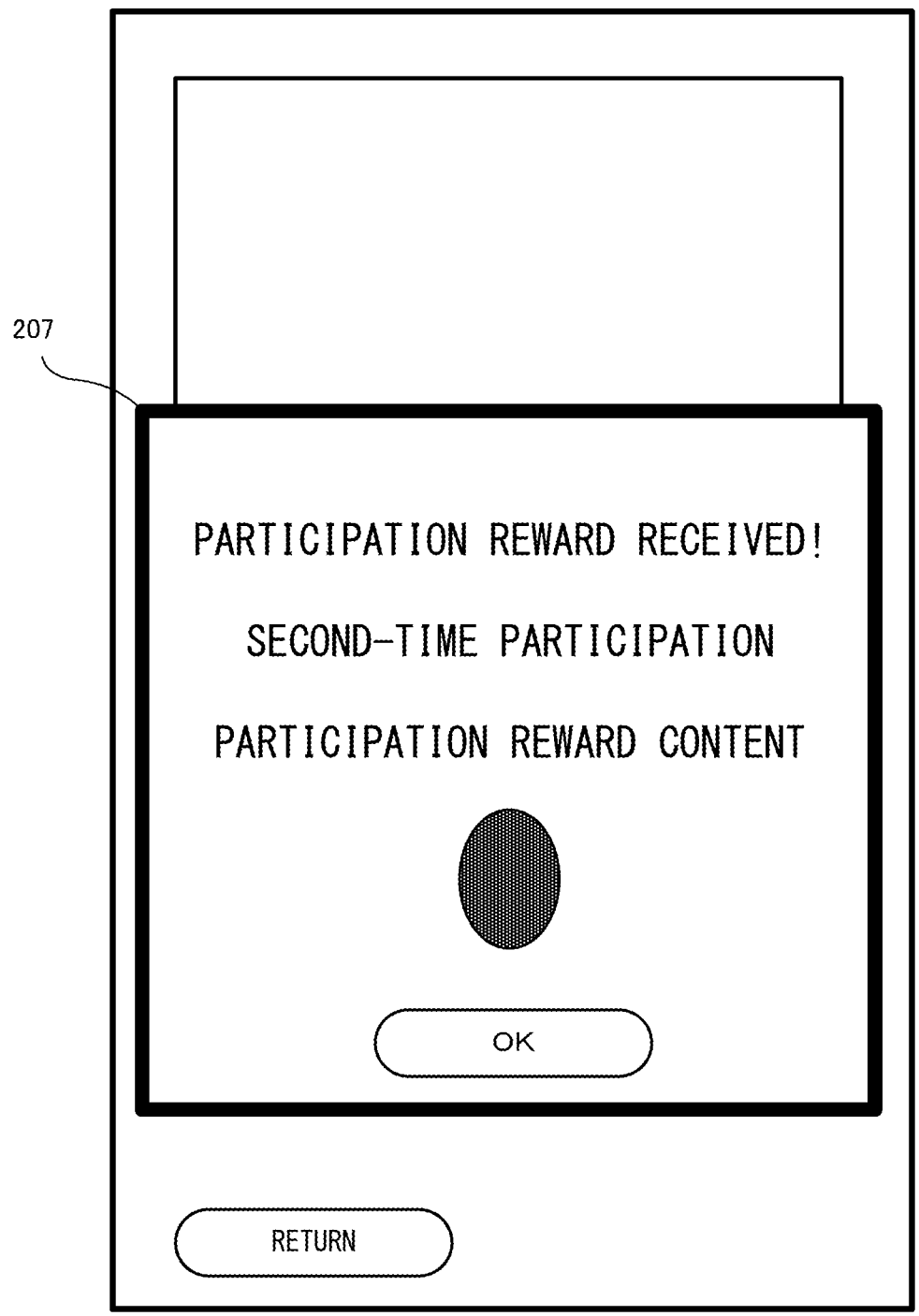
FIG. 5 shows a non-limiting example of a game screen.

Regarding the timing of giving the participation reward, in the exemplary embodiment, the participation reward is given at a timing of first-time participation in any unit period. In the unit period, the participation reward is not given for the second-time participation or later. Therefore, in FIG. 4, when the event participating operation is performed for the first time in the unit period, a pop-up indication 207 as shown in FIG. 5 is displayed prior to display of attack representation and the like as described above. The pop-up indication 207 indicates that the participation reward is received with respect to the event participating operation. Then, when the pop-up indication 207 is closed by a predetermined operation, display of attack representation and the like as described above is started.

The exemplary embodiment shows the example in which the participation reward is given at the timing (almost at the same time) when the event participating operation is performed, but the timing of giving the participation reward is not limited thereto. The participation reward may be given at a predetermined timing when a predetermined time has passed since the timing when the event participating operation was performed. For example, the participation reward may be given at a timing when half a day has passed since the event participating operation was performed, or may be given after one day has passed. Alternatively, a configuration in which the participation reward is sent to a so-called "present box" and the user receives the participation reward at a desired timing, may be adopted.

In the exemplary embodiment, there is an upper limit on the number of unit periods in which the participation rewards are given. In other words, an upper limit (hereinafter, upper limit unit period number) is set on the number of unit periods in which the participation rewards can be given in the entire event holding period. The upper limit unit period number is assumed to be two or more. In the exemplary embodiment, the upper limit unit period number is set to 5, as an example. That is, the participation rewards are set in advance for five times of the unit periods (for five days in total). Therefore, not all the participation rewards prepared as described above are obtained in only one unit period (in this example, one day). In other words, it is necessary to participate in the event for at least the upper limit unit period number of times, in order for the user to obtain all the participation rewards. In this way, it is possible to provide the user with a motivation to play the event continuously over a plurality of unit periods.

Because of the presence of the upper limit unit period number as described above, if any user is given the participation rewards for five times, the user is not given the participation rewards any more even when the user participates in the event in the subsequent unit periods. In the following description, the participation reward for the first-time participation is referred to as "participation reward A", the participation reward for the second-time participation is referred to as "participation reward B", the participation reward for the third-time participation is referred to as "participation reward C", the participation reward for the fourth-time participation is referred to as "participation reward D", and the participation reward for the fifth-time participation is referred to as "participation reward E". The contents of these participation rewards may be the same or may be different. In the exemplary embodiment, it is assumed that the contents of the participation rewards for five times are all different, as an example. The number of contents in the participation reward for each unit period may be any number. For example, the participation reward A may be "three items A", the participation reward B may be "five items B", the participation reward C may be "one weapon C", etc.

In the exemplary embodiment, the contents of the participation rewards as described above are presented in advance so that the user can confirm them. In the example shown in FIG. 4, the participation rewards corresponding to the five unit periods are presented in the participation reward presentation area 202. In FIG. 4, participation reward images 206A to 206E corresponding to the participation reward A to participation reward E described above are arranged in the horizontal direction with the first one at the left end. The participation reward image 206A is displayed in a grayed out manner or with a check mark so that it is indicated that the participation reward A has already been given.

As described above, each user participating in the event performs the event participating operation on the event screen, to make an attack to the event boss, and thus can decrease the HP of the event boss which is shared in common by the participating users. Here, as described above, the event is ended at the time when the HP of the event boss becomes 0, even before the final day of the event holding period passes. Therefore, for example, if the HP of the event boss becomes 0 on the third day from the start of the event and thus the event is ended, occasions for obtaining the participation rewards D and E for the fourth time and the fifth time among the participation rewards for five times are lost. In other words, it can be said that the participation rewards D and E are rewards that will never be given to the user even if the user has participated in the event every day until the event is ended since the start of the event. As described above, the contents of the participation rewards are presented to the user on the event screen, and therefore it is considered that, for example, the user who is going to participate in the event every day has expectation of obtaining all the participation rewards for five times. However, if a situation in which the event is ended early as described above has occurred, the result is contrary to the expectation of this user, and this can lead the user to lose interest in the game and the event. Accordingly, in the exemplary embodiment, in a case where the number of times the unit period has come until the event is ended (i.e., the number of days from the start to the end of the event) is smaller than the upper limit unit period number, processing for giving the user the participation rewards D and E for which occasions for giving them have been lost is performed. Thus, a result conforming to the above user's expectation can be obtained. In addition, in the exemplary embodiment, the participation rewards for which occasions for giving them have been lost are given to all the users of the game application, including users (hereinafter, non-participant users) who have not participated in the event. As used herein, the "users of the game application" are assumed to be users who have signed up as users of the game application and whose user data are recorded in the server 101, for example.

Several examples of patterns for giving the participation rewards as described above in the exemplary embodiment will be described. Here, the holding period of the event is up to 10 days as described above, and therefore, as a specific example, a case where the holding period is from August 1 to August 10 will be described. In addition, it is assumed that participation rewards for five times are set as described above. It is noted that a case where the HP of the event boss becomes 0 in fewer days (in this example, 1 to 4) than the upper limit unit period number (in this example, 5) is referred to as "early defeat". In addition, the participation reward for which a giving occasion has been lost and which is thus a target to be separately given to the user, as described above, is referred to as "compensation target reward", in the following description. FIG. 6 shows, in a table format, the relationship of the day number from the start of the event, the corresponding unit period, the number of remaining days of the event, and compensation target rewards when early defeat occurs, under the assumption that one user participates in the event every day. In the example shown in FIG. 6, in a case where early defeat has occurred at, for example, 15:00 on the first day (August 1) of the event being held, the participation rewards B to E, i.e., the participation rewards for the second to fifth times are compensation target rewards. In a case where early defeat has occurred at 15:00 on the third day (August 3) of the event being held, the participation rewards D to E, i.e., the participation rewards for the fourth and fifth times are compensation target rewards. Defeat of the event boss on the fifth day or later is not regarded as "early defeat". Therefore, in the period later than this, compensation target rewards do not arise.

Next, FIG. 7 shows, in a table format, the relationship of a plurality of users different in participation condition during the holding period, and given rewards in a case where early defeat occurs and in a case where early defeat does not occur. In the table, four users, i.e., users A to D are shown as an example in the left column. The event participation conditions of the users are different. The user A corresponds to a case of participating on only the first day after the event is started. The user B corresponds to a case of participating on only the first and third days after the event is started. The user C corresponds to a case of participating every day until the event is ended after the event is started. The user D corresponds to a case of not participating in the event. The middle column shows participation rewards eventually given in a case where early defeat has occurred, and the right column shows participation rewards eventually given in a case where early defeat has not occurred. Here, as an example of early defeat, it is assumed that early defeat occurs on the third day from the start of the event. In addition, as an example of the case where early defeat does not occur, it is assumed that the HP of the event boss becomes 0 on the seventh day from the start of the event.

In FIG. 7, first, regarding the user A who has participated on only the first day, in a case where early defeat has occurred, the participation reward A is given for the participation on the first day (first time in total). In addition thereto, the participation rewards D and E corresponding to participations for the fourth and fifth times are given as compensation target rewards. Here, the reason why the participation rewards for the second and third times are not compensation target rewards is that indeed the user A has been given occasions for participating on the second day and the third day from the start of the event. In other words, participation rewards for which all the users have lost occasions to be given them are regarded as compensation targets. In this case, all the users have equally lost occasions to participate in the event for the participation rewards for the fourth and fifth times, and thus none of the users are given these participation rewards. However, the participation rewards for the second and third times could be given if the user A participated in the event, and some users such as the users B and C described later are given the participation rewards for the second and third times. Therefore, for example, in a case where a user has not participated in the event even though there was an occasion to participate in the event, if the participation reward corresponding to the participation for that day is given to this user, there is a possibility that some users such as the user C who has participated every day feel a sense of unfairness or the like among the users. Therefore, in the exemplary embodiment, only participation rewards for which all the users have lost occasions to be given them are given as compensation target rewards to all the users.

On the other hand, in a case where early defeat has not occurred, the user A is given only the participation reward A for the participation on the first day. This is because the user A participated only once on the first day even though the user A was given participation occasions for seven times (seven days) during the event holding period.

Next, regarding the user B who participated on only the first and third days, in a case where early defeat has occurred, the participation reward A for the participation on the first day is given. Further, the participation reward B for the participation on the third day (second-time participation in total) is given. In addition thereto, the participation rewards D and E corresponding to participations for the fourth and fifth times are given as compensation target rewards, for the same reason as described above. On the other hand, in a case where early defeat has not occurred, only the participation rewards A and B are given because the user B has participated only twice among the seven days until the end of the event.

Next, regarding the user C who has participated in the event every day until the HP of the boss becomes 0, in a case where early defeat has occurred, the participation rewards A to C are given for the participations for the first to third times, and the participation rewards D and E are given as compensation target rewards. On the other hand, in a case where early defeat has not occurred, the participation rewards A to E are given for the participations for the first to fifth times. That is, the participation rewards D and E in this case are not compensation target rewards.

Next, regarding the user D who has not participated in the event, in a case where early defeat has occurred, the participation rewards D and E are given as compensation target rewards. On the other hand, in a case where early defeat has not occurred, there are no compensation target rewards arising, and therefore any participation rewards are not given.

[Details of Game Processing in Exemplary Embodiment]

Next, with reference to FIG. 8 to FIG. 21, processing relevant to the event in the exemplary embodiment will be described in more detail. Here, processing relevant to the event and giving of the participation rewards as described above will be mainly described, while description of other game processing is omitted.

[Used Data]

Figure 8:
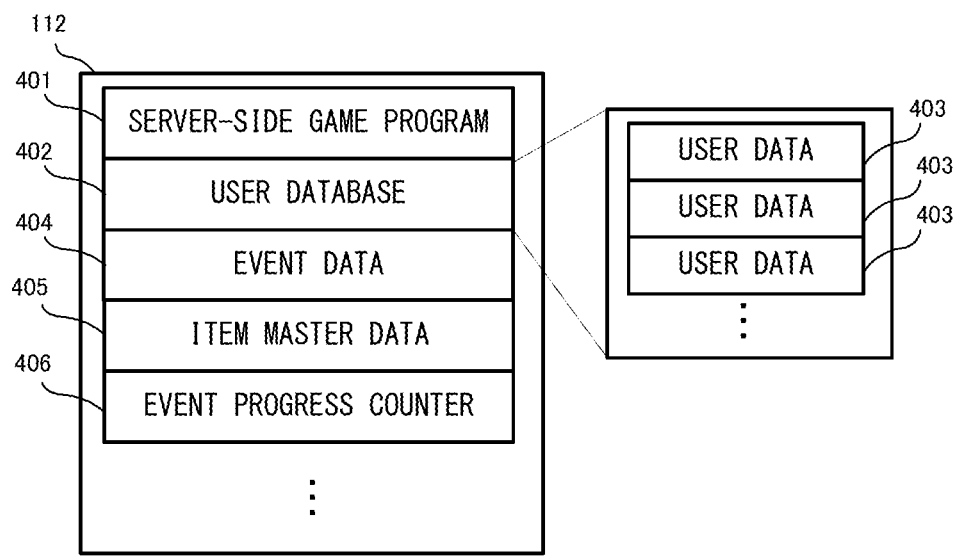
FIG. 8 is a memory map showing a non-limiting example of various data stored in a memory 112 of the server 101.

First, various data to be used for the processing in the exemplary embodiment will be described. First, data used in the server 101 will be described. FIG. 8 is a memory map showing an example of various data stored in the memory 112 of the server 101. The memory 112 of the server 101 stores a server-side program 401, a user database 402, event data 404, item master data 405, an event progress counter 406, and the like.

The server-side program 401 is a program for executing a game application in the exemplary embodiment. The program includes codes for executing an event process according to the exemplary embodiment. Besides, the program also includes codes for executing a log-in process for a user, a process for transmitting predetermined user data 403 included in the user database 402 to the information processing terminal 102 or receiving such data, and the like.

Figure 9:
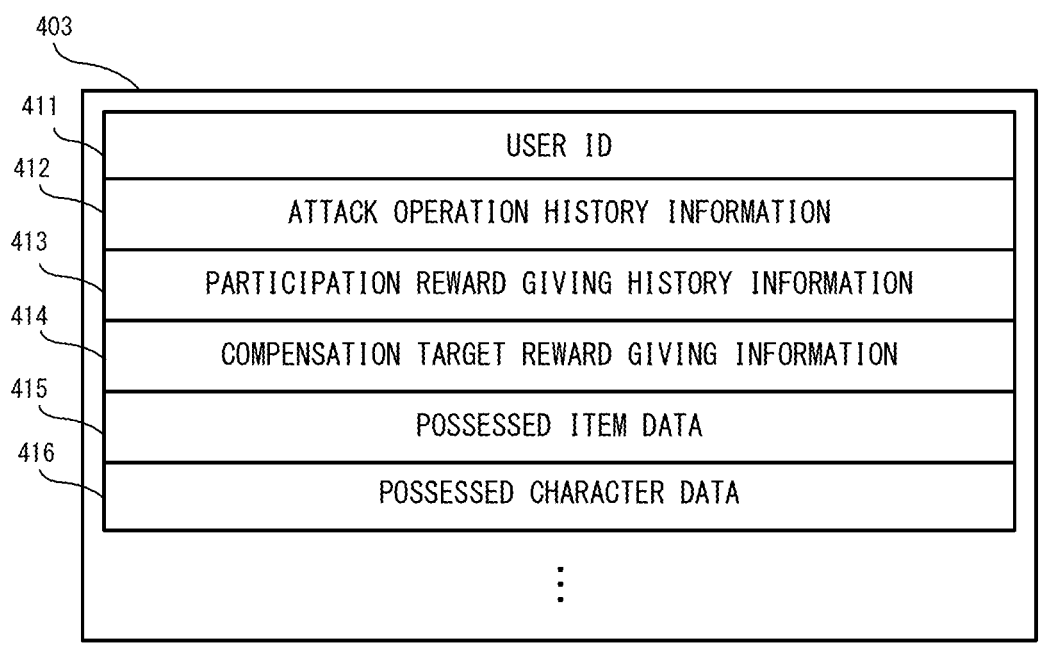
FIG. 9 shows a non-limiting example of the data structure of user data 403.

The user database 402 is a database of collection of data about users who play the game application according to the exemplary embodiment. In the exemplary embodiment, the user database 402 is a database in which each user data 403 as shown in FIG. 9 is stored as one record. After a log-in process is performed, the information processing terminal 102 performs a process of acquiring the user data 403 corresponding to the user from the server 101, and the like, as necessary.

With reference to FIG. 9, the data structure of the user data 403 will be described. The user data 403 shown in FIG. 9 includes a user ID 411, attack operation history information 412, participation reward giving history information 413, compensation target reward giving information 414, possessed item data 415, possessed character data 416, and the like. The user ID 411 is an ID for uniquely identifying each user. In the attack operation history information 412, a history of dates and times when the user performed an attack operation to an event boss in each event is recorded in a discriminable manner on an event basis. The participation reward giving history information 413 is information indicating the history of giving of the participation rewards to the user. That is, this information indicates for what times the participation rewards have already been given. This information is also recorded in a discriminable manner on an event basis. In the compensation target reward giving information 414, information about whether or not a compensation target reward has been given, and the content thereof, are recorded on an event basis. The possessed item data 415 is information indicating an in-game item that the user has. The possessed character data 416 is information indicating the character that the user has. Besides, although not shown, the user data 403 includes data (so-called saved data) indicating the game advancement status, information about each user such as an individual user account name, and the like.

With reference to FIG. 8 again, the event data 404 is data defined with respect to the in-game event. FIG. 10 shows an example of the data structure of the event data 404. The event data 404 is table-format data in which elements such as an event ID 421, a holding status 422, holding schedule information 423, participation reward information 424, an initial HP 425, and a present HP 426 are stored as each record. Each record in the event data 404 can be added, changed, or deleted by a game application administrator or the like as necessary.

The event ID 421 is an ID for uniquely identifying the in-game event. The holding status 422 is information indicating in which state the event is, "before started", "being held", or "ended". The holding schedule information 423 is information defining the event start date and the event end date. It is noted that, as described above, in a case where early defeat occurs, the event can be ended earlier than the end date defined here.

Figures 11, 12:
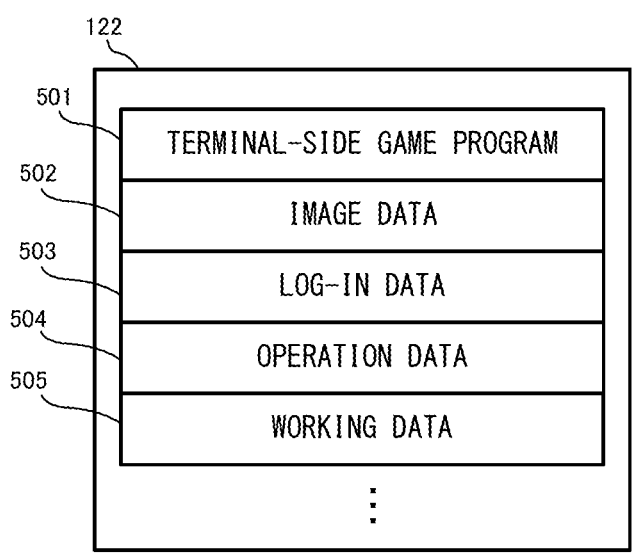
FIG. 11 shows a non-limiting example of the data structure of participation reward information 424.
FIG. 12 is a memory map showing a non-limiting example of various data stored in a memory 122 of the information processing terminal 102.

The participation reward information 424 is data defining the contents of the participation rewards for each event. In the example of the exemplary embodiment, the participation rewards for five times and the contents thereof are defined. FIG. 11 shows an example of the data structure of the participation reward information 424 in the exemplary embodiment. As shown in FIG. 11, the participation reward information 424 is table-format data formed by a giving count number 431 and a reward content 432. In the example shown in FIG. 11, information about in-game items as the reward contents and the numbers of the in-game items to be given is defined for the respective times from the first time to the fifth time. As a matter of course, the rewards are not limited to in-game items, and in-game currency may be defined as the reward.

With reference to FIG. 10 again, the initial HP 425 is data defining the initial HP of the event boss. The present HP 426 is data indicating the present HP of the boss in each event. The present HP 426 is decreased from the value of the initial HP 425 in accordance with attacks from participant users. When the value of the present HP 426 has finally become 0, the event boss is defeated and processing for ending the event is performed.

Besides, although not shown, the event data 404 includes data defining images of event bosses, attack methods thereof, and the like, information defining event ending conditions, and various other data to be used for holding the event.

With reference to FIG. 8 again, the item master data 405 is data defining all in-game items in the game application of the exemplary embodiment. Predetermined in-game items selected from this data can be defined as the participation rewards.

The event progress counter 406 is data used for managing the progress status of the in-game event in the process according to the exemplary embodiment. Specifically, the initial value is set to 1, and the event progress counter 406 is incremented by 1 as a predetermined period passes from the start of the event. In the exemplary embodiment, it is assumed that the above period for increment is defined as "one day" which is the same as the unit period. That is, every time 24 hours have passed since the start of the event, the event progress counter 406 is incremented by 1. In another exemplary embodiment, the period for increment may be set to 6 hours, so that the event progress counter 406 is incremented by 4 per one day. In the exemplary embodiment, using this counter, the event holding period can be managed in a state of being divided into terms on a several-hour basis, and the number of remaining days of the event and the like can be recognized.

Besides, various data necessary for holding the event and performing the game processing are stored in the memory 112 of the server 101.

Next, various data stored in the memory 122 of the information processing terminal 102 will be described. FIG. 12 is a memory map showing an example of various data stored in the memory 122 of the information processing terminal 102. The memory 122 of the information processing terminal 102 stores a terminal-side game program 501, image data 502, log-in data 503, operation data 504, working data 505, and the like.

The terminal-side game program 501 is a program for executing the game application according to the exemplary embodiment. The program also includes codes for executing the process relevant to the event as described above.

The image data 502 is data of various images to be displayed in the game application including the event.

The log-in data 503 includes various data necessary for logging in the game application of the exemplary embodiment.

The operation data 504 is data indicating the contents of various operations performed on the operation section 15. In the exemplary embodiment, the operation data 504 includes information about whether or not an input is performed on the touch panel as the operation section 15, data indicating the touch coordinates and the like, and data indicating the press statuses of various buttons (not shown) and the like.

The working data 505 includes various data that are temporarily used in the process relevant to the event. In execution of the game processing, such data can be generated and stored appropriately as necessary.

[Details of Processing of Server 101]

Next, the details of the event process according to the exemplary embodiment will be described. First, the details of the event process executed by the server 101 will be described. Here, as an example, it is assumed that one event is being held at present, i.e., the event start date thereof has come or passed. More specifically, the event corresponding to the record whose event ID 421 is "0002" in FIG. 10 will be described as an example. Regarding changing of the holding status 422 from "before started" to "being held", the processor 111 may determine whether or not the event start date has come, on the basis of the present date and time and the holding schedule information 423. Then, if the event start date has come, the processor 111 may perform processing of changing the holding status 422 from "before started" to "being held" as appropriate.

Figure 13:
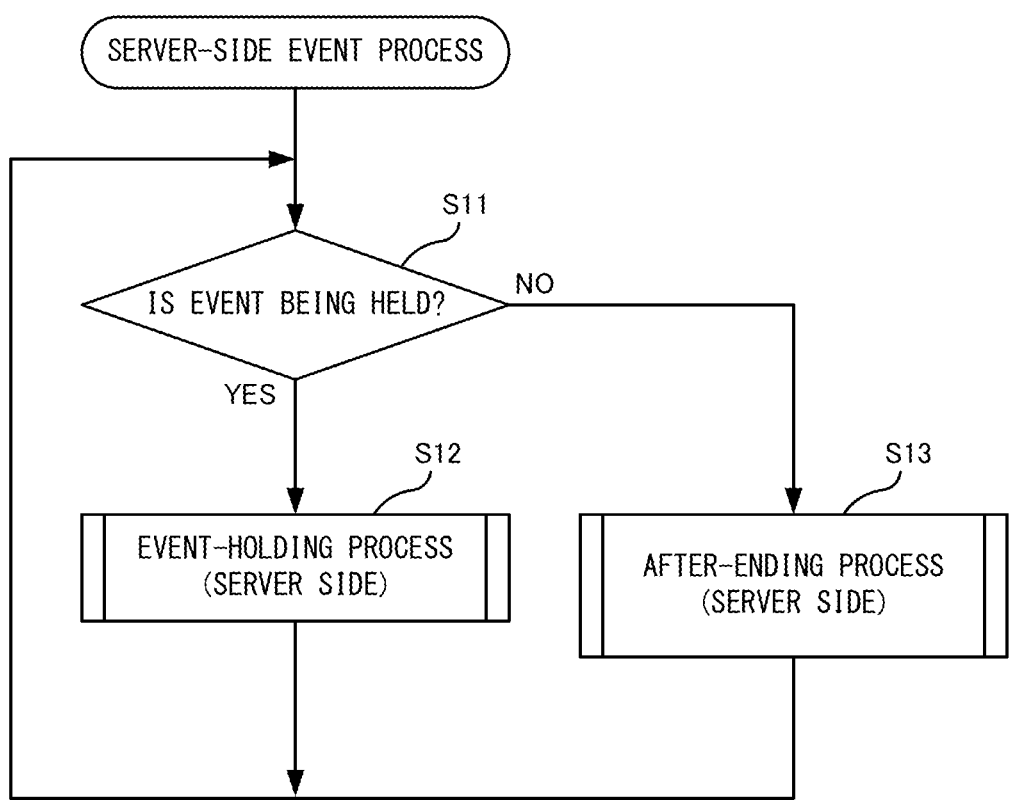
FIG. 13 is a non-limiting example of a flowchart showing the details of an event process (server-side event process) executed by the server 101.

FIG. 13 is a flowchart showing the details of the event process (server-side event process) executed by the server 101. First, in step S11 in FIG. 13, the processor 111 refers to the holding status 422, and determines whether the event is being held or the event has ended. If the event is being held (YES in step S11), in step S12, the processor 111 executes an event-holding process (server side). On the other hand, if the event has ended (NO in step S11), in step S13, the processor 111 executes an after-ending process (server side).

[Server-Side Process while Event is being Held]

Figure 14:
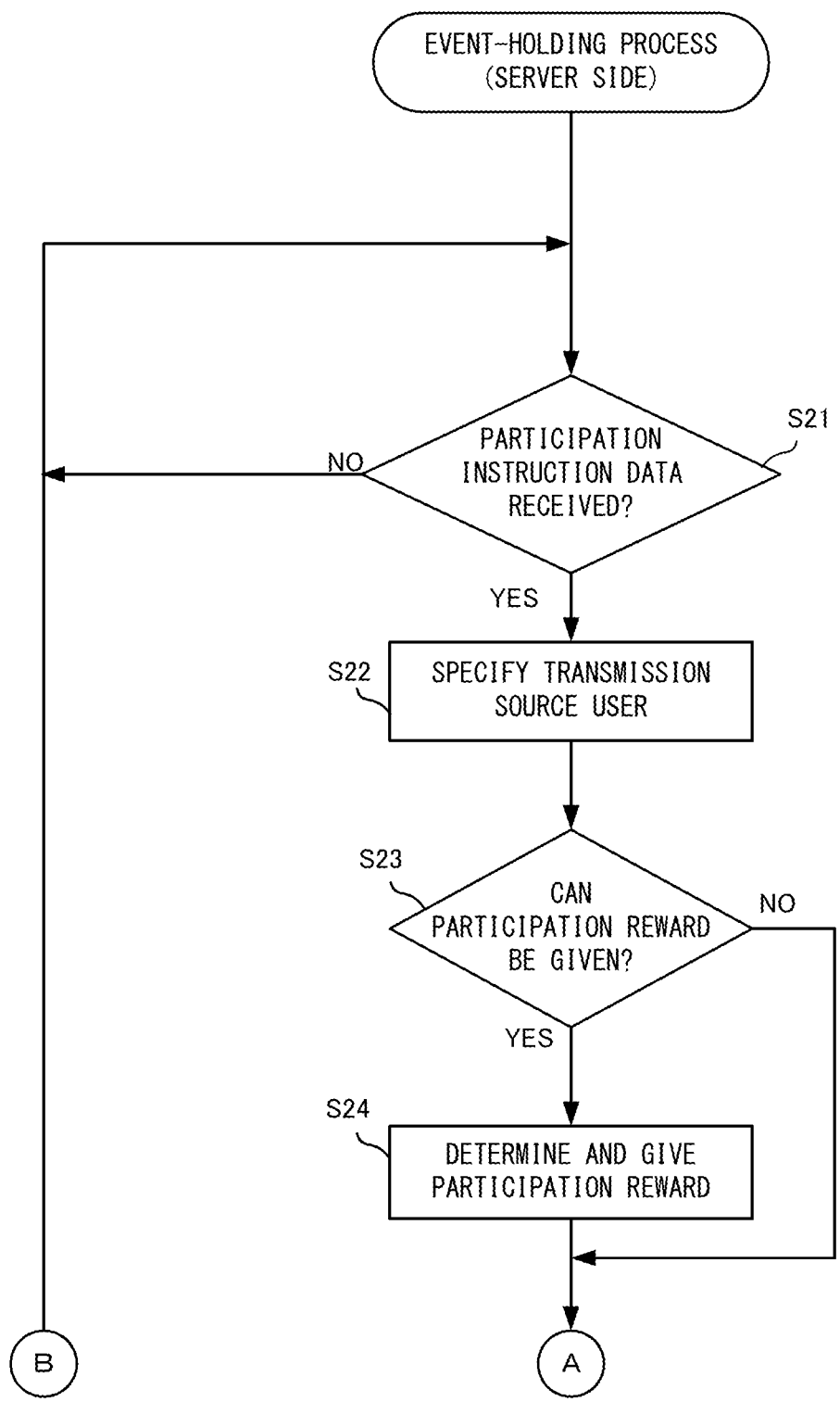
FIG. 14 is a non-limiting example of a flowchart showing the details of an event-holding process (server side)
Figure 15:
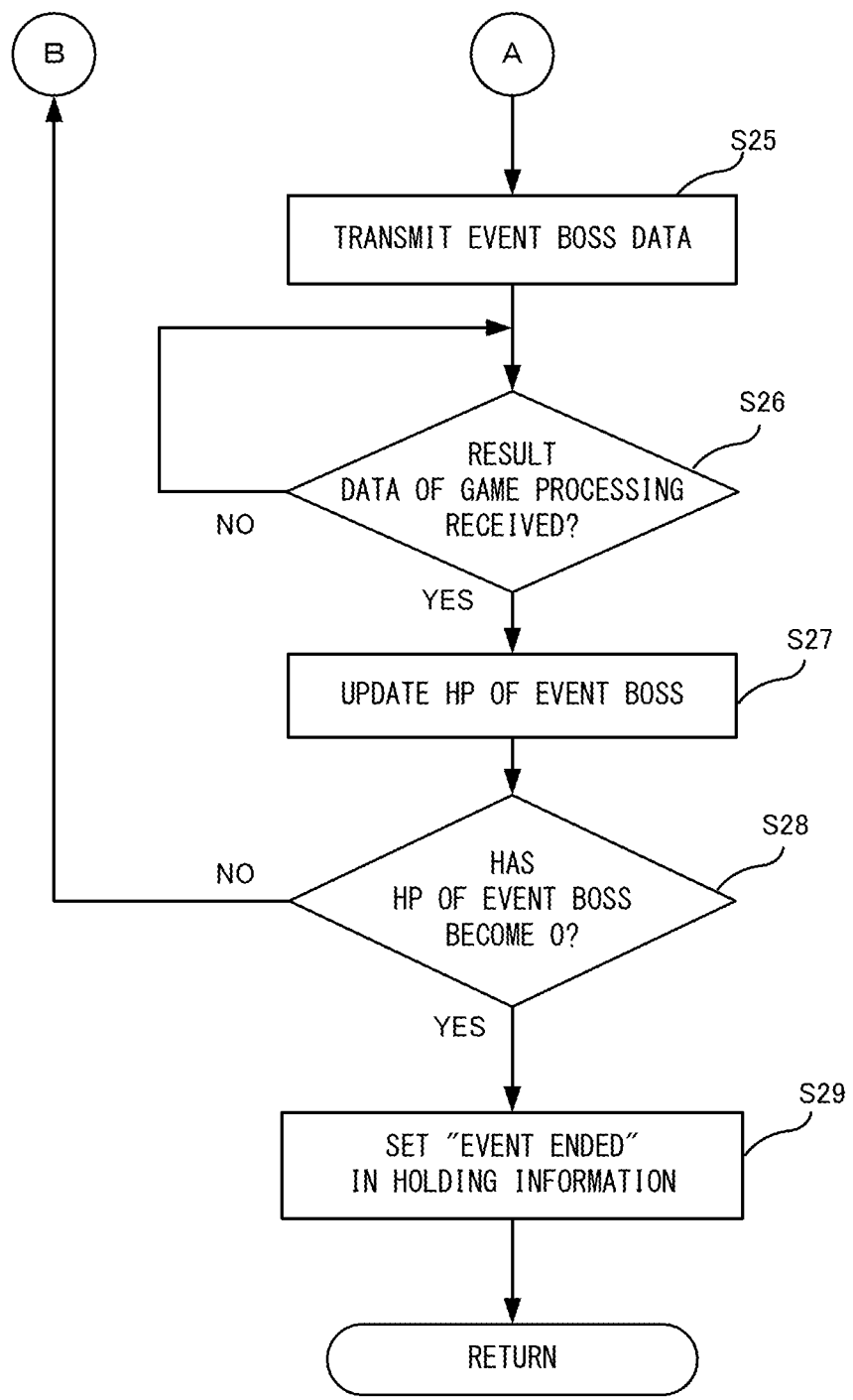
FIG. 15 is a non-limiting example of a flowchart showing the details of the event-holding process (server side)

FIG. 14 and FIG. 15 are flowcharts showing the details of the event-holding process (server side) in step S12. It is noted that a processing loop from step S21 to step S28 in this process is repeated at a predetermined processing cycle. In performing the process shown in FIG. 14 and FIG. 15, a notification that the event is being held may be sent to the information processing terminal 102 as necessary. In FIG. 14, first, in step S21, the processor 111 determines whether or not participation instruction data transmitted from the information processing terminal 102 has been received. It is noted that the participation instruction data is data sent to the server 101 in response to the participation button 203 being operated in the information processing terminal 102. As a result of the determination, if the participation instruction data has not been received (NO in step S21), the processing is repeated until the participation instruction data is received. On the other hand, if the participation instruction data has been received (YES in step S21), in step S22, the processor 111 specifies the user at the transmission source of the participation instruction data.

Next, in step S23, the processor 111 determines whether or not it is possible to give a participation reward for the unit period in which the participation instruction data is transmitted. Specifically, the processor 111 refers to the participation reward giving history information 413 for the user, and determines whether or not the participation reward has already been given to the user in the present unit period. As a result of the determination, if the participation reward for the present unit period has not been given yet (YES in step S23), this means that it is possible to give the participation reward. In this case, in step S24, the processor 111 determines the content of the participation reward to be given, on the basis of the participation reward information 424. Then, the processor 111 gives the determined participation reward to the user. Specifically, the processor 111 adds the participation reward to the possessed item data 415 of the corresponding user. Then, the process proceeds to step S25, to shift to execution of the game processing. On the other hand, as a result of the determination, if the participation reward for the present unit period has already been given (NO in step S23), the processing in step S24 is skipped, to proceed to the next processing.

Next, in step S25 in FIG. 15, the processor 111 transmits data relevant to the present event boss, to the information processing terminal 102 that has transmitted the above participation instruction data. Specifically, the processor 111 transmits the relevant data, including the value of the present HP 426, to the information processing terminal 102. In the information processing terminal 102, game processing based on the data transmitted here is executed as described later, and data indicating the result thereof is transmitted to the server 101.

Next, in step S26, the processor 111 determines whether or not the result data of the game processing has been received from the information processing terminal 102. As a result, if the result data has not been received yet (NO in step S26), the process for receiving the result data is repeated to wait until the result data is transmitted. On the other hand, if the result data has been received (YES in step S26), next, in step S27, the processor 111 updates the value of the present HP 426 on the basis of the result data. That is, the processor 111 executes processing of decreasing the HP of the event boss in accordance with the result of user's attack to the event boss.

Next, in step S28, whether or not the present HP 426 of the event boss has become 0 is determined. As a result, if the present HP 426 has not become 0 yet (NO in step S28), the process returns to step S21, to repeat the process. On the other hand, if the present HP 426 has become 0 (YES in step S28), the event being held is to be ended, i.e., in step S29, the processor 111 sets the holding status 422 to a value indicating "the event is ended". Then, the event-holding process (server side) is ended.

[Process of Server 101 after Event is Ended]

Figure 16:
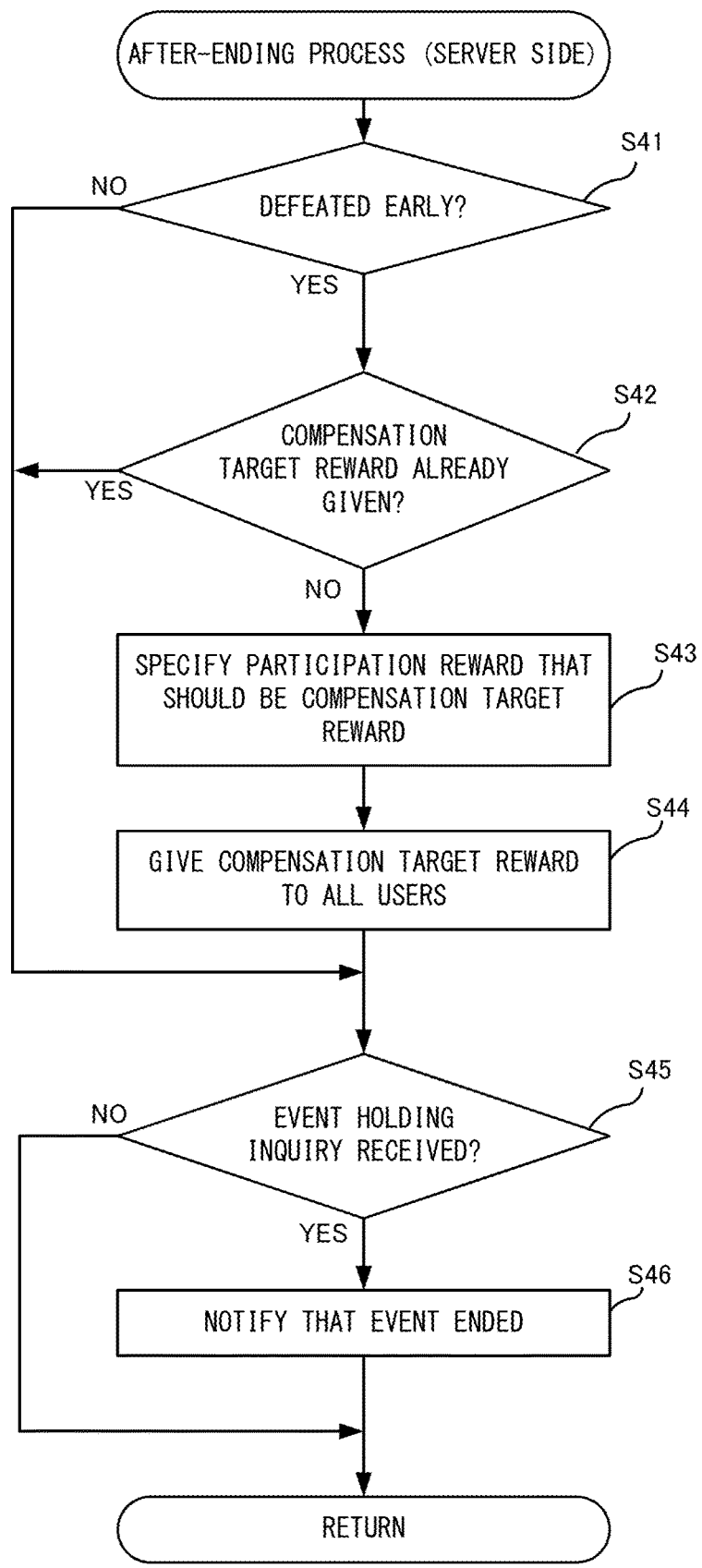
FIG. 16 is a non-limiting example of a flowchart showing the details of an after-ending process (server side)

Next, an after-ending process (server side) in step S13 in FIG. 13 will be described. FIG. 16 is a flowchart showing the details of the after-ending process (server side). First, in step S41, the processor 111 specifies the number of days until the HP of the event boss has become 0, and determines whether or not early defeat as described above has occurred. The determination may be performed by any method. In the exemplary embodiment, the determination is performed as follows. First, the processor 111 acquires the value of the event progress counter 406. Then, the processor 111 calculates the number of remaining days of the event under the assumption that the event is held until the final day. As described above, in the exemplary embodiment, every time 24 hours have passed since the start of the event, the event progress counter 406 is incremented by 1. In this case, the progress counter value is subtracted from the maximum number of days during which the event is held (in this example, 10), whereby the number of remaining days under the assumption that the event is held until the final day of the holding period is calculated. For reference, FIG. 17 shows, in a table format, the relationship of the value of the event progress counter 406 and the number of remaining days. In the example shown in FIG. 17, for example, in a case of the third day from the start of the event, the value of the event progress counter 406 is 3, and the number of remaining days under the assumption that the event is held until the final day is 7.

After the number of remaining days of the event is calculated as described above, whether or not the number of remaining days is greater than the upper limit unit period number (in this example, 5) is determined. That is, the processor 111 determines whether or not number of remaining days>upper limit unit period number is satisfied. Then, if this condition is satisfied, it is determined that early defeat has occurred, or if the condition is not satisfied, it is determined that early defeat has not occurred.

With reference to FIG. 16 again, as a result of the determination of step S41, if it is determined that early defeat has occurred (YES in step S41), next, in step S42, the processor 111 determines whether or not the compensation target reward has already been given. As a result, if the compensation target reward has already been given (YES in step S42), the process proceeds to step S45 described later.

On the other hand, if the compensation target reward has not been given yet (in other words, in a case where the after-ending process is executed for the first time after the event is ended), in step S43, the processor 111 specifies the participation reward that should be the compensation target reward as described above. This may be specified by any method. For example, it is assumed that early defeat has occurred on the fourth day (in this example, August 4) from the start of the event. In this case, under the assumption that the event participation rewards until the fourth time have already been given, the event participation reward for the fifth time is specified as the compensation target reward. For example, the number of event participation rewards assumed to have already been given is calculated by subtracting the number of remaining days from the maximum number of days during which the event is held. In a case where early defeat has occurred on August 4, calculation is performed as 10−6=4. In this case, it is considered that giving occasions until the fourth time have been provided to each user, and thus only the event participation reward for the fifth time is specified as the compensation target reward. That is, event participation occasions until the fourth day have been provided to all the users, but all the users have lost an event participation occasion for the participation reward for the fifth time and thus the giving occasion thereof is also lost. Therefore, the participation reward for the fifth time is determined as the compensation target reward. Similarly, for example, in a case where early defeat has occurred on the third day (in this example, August 3) from the start of the event, the participation rewards for the fourth and fifth times are determined as the compensation target rewards.

Next, in step S44, the processor 111 executes processing of giving the determined compensation target reward to all the users of the game application. That is, irrespective of whether or not each user has participated in the event, the processor 111 executes processing of adding the compensation target reward to the possessed item data 415 for each user. Further, the processor 111 records information indicating the addition date and time and the reward content in the compensation target reward giving information 414.

On the other hand, as a result of the determination of step S41, if early defeat has not occurred (NO in step S41), the processing in step S42 to S44 is skipped, to proceed to the next processing.

Next, in step S45, the processor 111 determines whether or not an inquiry for whether or not the event is being held has been received from any of the information processing terminals 102. If the inquiry has been received (YES in step S45), in step S46, the processor 111 transmits information indicating that the event has ended, to the information processing terminal 102 which is the inquiry source. On the other hand, if the inquiry has not been received (NO in step S45), the after-ending process (server side) is ended. Therefore, the process of the server 101 after the event is ended is substantially a process of merely sending a reply that the event has ended in response to the inquiry about holding of the event from the information processing terminal, if giving of the compensation target reward is finished.

[Process of Information Processing Terminal 102]

Figure 18:
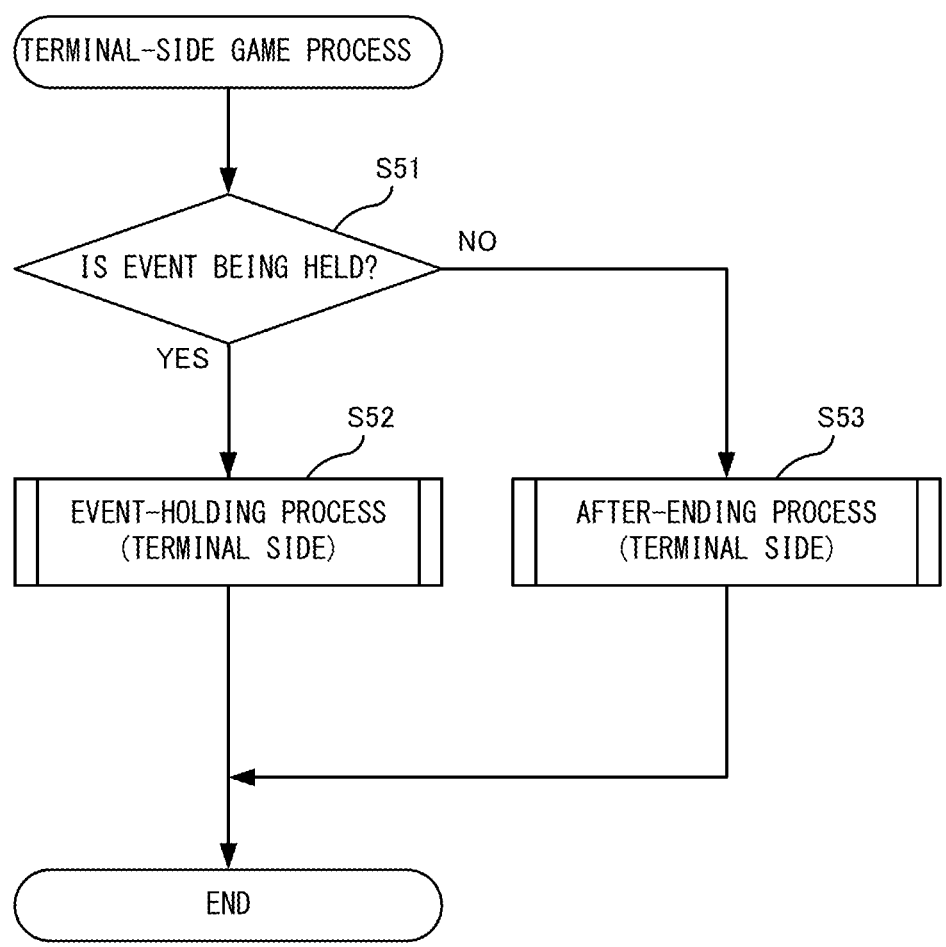
FIG. 18 is a non-limiting example of a flowchart showing the details of an event process executed by the information processing terminal 102.

Next, the details of the event process executed by the information processing terminal 102 will be described. FIG. 18 is a flowchart showing the details of the event process executed by the information processing terminal 102. Execution of this process is started when a predetermined operation for shifting to an event screen is performed, e.g., an "event" icon placed on a home screen of the game application is tapped by the user. In step SM in FIG. 18, first, the processor 121 determines whether the event is being held or the event has ended. The determination may be performed by any method. For example, processing of inquiring the server 101 whether or not the event is being held may be performed, and whether or not the event is being held may be determined on the basis of the reply result. Alternatively, calendar data in which the event holding schedule is defined may be acquired from the server 101, and then may be compared with the present date and time, to make the determination. In this case, if the present time and date are included in the event holding schedule, then the processor 121 may inquire the server 101 whether or not the event boss has any HP remaining. If the event boss has any HP remaining, it is determined that the event is being held, or if the HP is 0, it is determined that the event has ended. As a result of the determination, if the event is being held (YES in step S51), in step S52, the processor 121 executes an event-holding process (terminal side). On the other hand, if the event has ended (NO in step S51), in step S53, the processor 121 executes an after-ending process (terminal side).

[Terminal-Side Process while Event is being Held]

Figure 19:
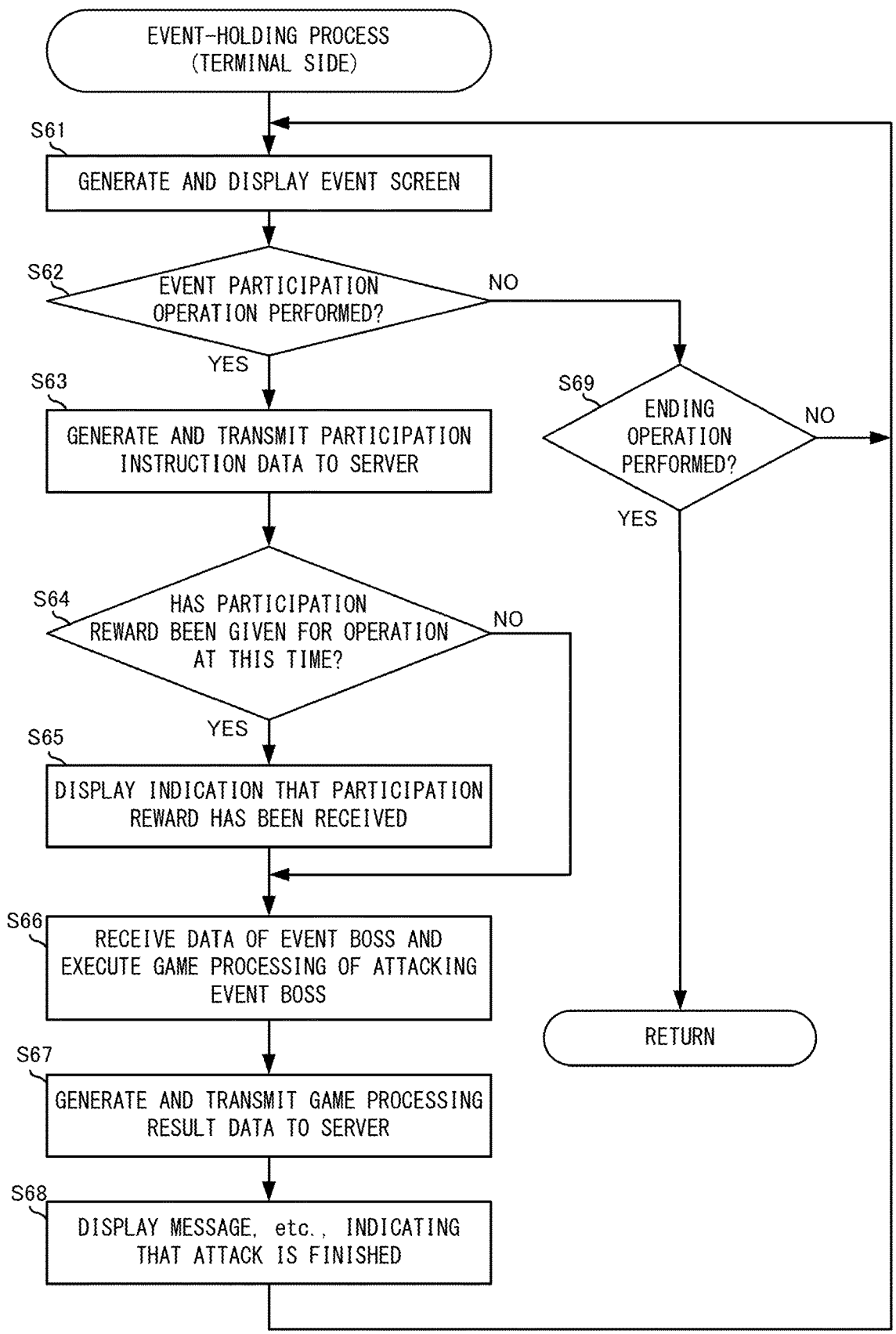
FIG. 19 is a non-limiting example of a flowchart showing the details of an event-holding process (terminal side)

FIG. 19 is a flowchart showing the details of the event-holding process (terminal side) in step S52. In FIG. 19, first, in step S61, the processor 121 generates an event screen as shown in FIG. 4. Specifically, the processor 121 generates an image to be displayed in the participation reward presentation area 202, on the basis of the participation reward information 424 acquired from the server 101. Further, the processor 121 generates an image to be displayed in the event information indication area 201, as appropriate, and combines these images to generate an event screen as shown in FIG. 4. Then, the event screen is outputted to the display section 124.

Next, in step S62, the processor 121 acquires the operation data 504 and determines whether or not the event participating operation (tapping on the participation button 203) has been performed. As a result of the determination, if the event participating operation has been performed (YES in step S62), next, in step S63, the processor 121 generates the participation instruction data for indicating that the event participating operation has been performed, and transmits the participation instruction data to the server 101. The participation instruction data includes information indicating that the event participating operation has been performed, various information (network address, etc.) for specifying the transmission source (i.e., the host terminal), information indicating the operation date and time, and the like. As previously described, in the server 101, determination as to the necessity of giving the participation reward and processing of giving the participation reward are performed as appropriate in accordance with the received participation instruction data.

Next, in step S64, the processor 121 determines whether or not the participation reward has been given for the event participating operation performed at this time. That is, the processor 121 determines whether or not the event participating operation has been performed for the first time in the present unit period. The determination may be performed by any method. In the exemplary embodiment, the processor 121 acquires the participation reward giving history information 413 at this time from the server 101, and on the basis of this, determines whether or not the participation reward has already been given in the present unit period. In another exemplary embodiment, a notification that the participation reward has been given for the event participating operation may be sent from the server 101 to the information processing terminal 102, and through determination as to whether or not the notification has been received, the information processing terminal 102 may determine whether or not the participation reward has been given.

As a result of the determination of step S64, if the participation reward has been given for the event participating operation at this time (YES in step S64), in step S65, the processor 121 generates the pop-up indication 207 as shown in FIG. 5 and displays the pop-up indication 207 on the display section 124. On the other hand, if the participation reward has not been given for the event participation reward at this time (i.e., the participation reward was already given) (NO in step S64), the processing in step S65 is skipped, to proceed the next processing.

Next, in step S66, the processor 121 receives data about the event boss at this time from the server 101, and executes game processing based on the data. Specifically, the processor 121 calculates the value of the dealt damage to the event boss. In another exemplary embodiment, in the game processing, processing of displaying a predetermined game screen and allowing the user to operate the player character may be performed. Also in this case, processing of calculating the value of the dealt damage to the event boss on the basis of the user's operation content, is performed. In the exemplary embodiment, it is assumed that the value of the dealt damage is calculated on the information processing terminal 102 side. However, in another exemplary embodiment, the value of the dealt damage may be calculated on the server 101 side. In this case, the calculation result may be transmitted to the information processing terminal 102, and processing of displaying an attack representation based on the result may be performed in the game processing on the information processing terminal side.

Next, in step S67, the processor 121 generates game processing result data, including the value of the dealt damage. Then, the processor 121 transmits the game processing result data to the server 101.

Next, in step S68, the processor 121 generates a message or the like indicating that an attack to the event boss has finished, and displays the message or the like on the display section 124. Then, when a predetermined operation for making an instruction to end the display of the message is performed, the process returns to step S61, to repeat the process.

Next, as a result of the determination of step S62, a case where the event participating operation has not been performed (NO in step S62) will be described. In this case, in step S69, the processor 121 determines whether or not an operation of ending the event screen has been performed. As a result of the determination, if the ending operation has not been performed (NO in step S69), the process returns to step S61, to repeat the process. On the other hand, if the ending operation has been performed (YES in step S69), the event-holding process (terminal side) is ended.

[Process of Information Processing Terminal 102 after Event is Ended]

Figure 20:
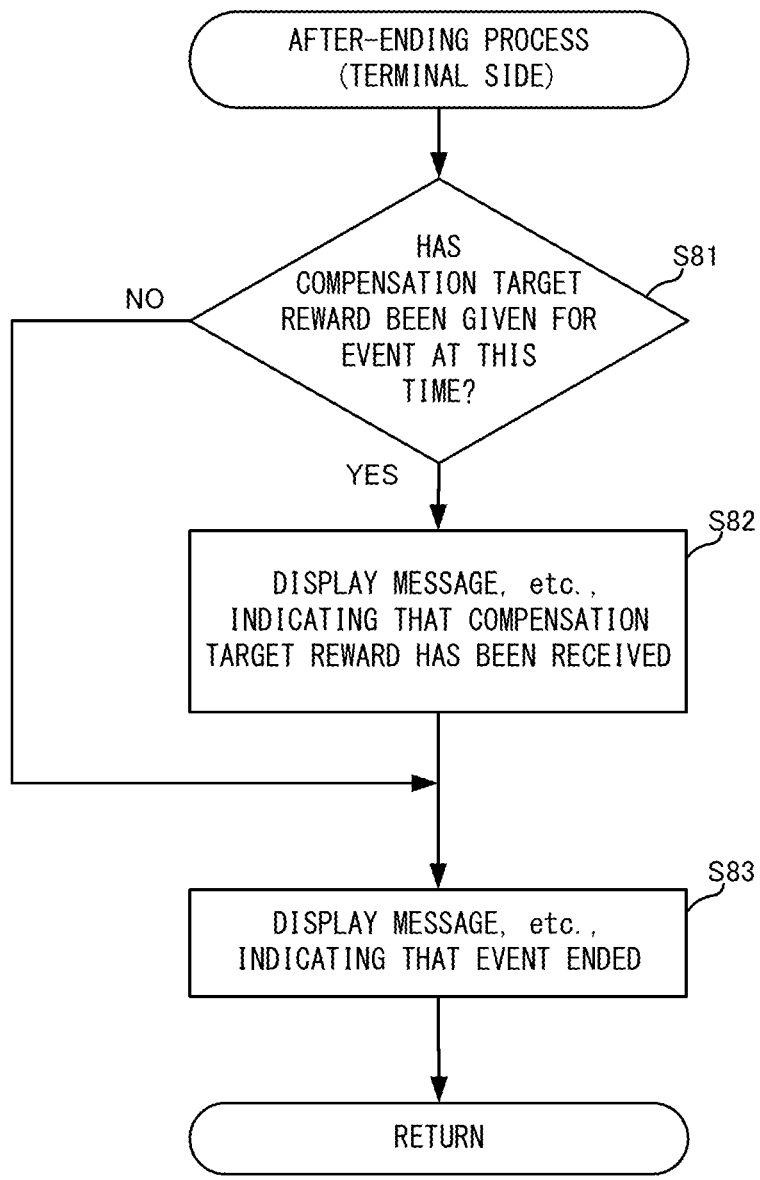
FIG. 20 is a non-limiting example of a flowchart showing the details of an after-ending process (terminal side).

Next, the after-ending process (terminal side) in step S53 in FIG. 18 will be described. FIG. 20 is a flowchart showing the details of the after-ending process (terminal side). First, in step S81, the processor 121 determines whether or not the compensation target reward has been given for the event that has ended at this time. This can be determined by acquiring the compensation target reward giving information 414 from the server 101 and referring thereto. As a result of the determination, if the compensation target reward has been given (YES in step S81), in step S82, the processor 121 generates a message indicating that the compensation target reward has been received, as appropriate, and displays the message on the display section 124. On the other hand, if the compensation target reward has not been given (NO in step S81), the processing in step S82 is skipped.

Next, in step S83, the processor 121 generates a message or the like indicating that the event has ended, and displays the message or the like on the display section 124. Then, when a predetermined operation for ending this screen is performed, the event after-ending process is ended.

As described above, in the exemplary embodiment, the participation rewards are prepared in the event in which the participants cooperate to defeat the boss whose HP is dealt with in common by the participants. The participation reward is a reward to be given for the user having participated in the game event during each unit period in the period in which the game event is held. For the participation reward, the upper limit number of unit periods in which the participation rewards can be given in the entire period in which the game event is held, is set. The reward contents are presented to the user in advance. Then, if the number of times the unit period has come until the end of the game event since the start of the game event is smaller than the upper limit number of unit periods, at least some of non-given rewards which are the participation rewards that have not been given to the user are given to the user. In other words, even though the user has expected to be given the above presented rewards, the event goal might be achieved in fewer days than the upper limit number of unit periods in which the rewards can be given, so that the event might be ended. In this case, the rewards for which occasions for giving them are lost due to such early ending are given to the user. Thus, it is possible to prevent loss of the user's expectation that the participation rewards will be given.

[Modifications]

The above exemplary embodiment has shown the case of decreasing the HP of the event boss shared in common by the participants, as an example of the event. However, in another exemplary embodiment, the value of a predetermined parameter of the event boss may be increased through a predetermined operation corresponding to the attack operation. Then, if the value of the parameter exceeds a predetermined value set as an event ending condition, it may be determined that the event ending condition is satisfied. Further, the way of advancing the event is not limited to such a manner of attacking the event boss as described above. The way of advancing the event may be any way, as long as a predetermined parameter to be dealt with in common by the participants is changed through processes based on the respective participants' operations, and when the parameter satisfies a predetermined condition, the event is ended even if a scheduled ending date set in advance has not come yet.

Regarding the contents of participation rewards, the example in which the contents of participation rewards are determined in accordance with the number of days on which the user has participated during the event, has been shown. In another exemplary embodiment, the participation rewards may be determined in accordance with the dates, instead of the number of participation days as described above. For example, the participation reward for "August 1" may be defined as participation reward A, and the participation reward for "August 2" may be defined as participation reward B. In this case, for example, it is assumed that the user A participates in the event for the first time on August 1, and the user B participates in the event for the first time on August 2. In this case, both players participate in the event for the first day in total, but the reward contents to be given for the respective participations are different from each other. That is, with respect to participation in the event for the first day in total, the participation reward A is given to the user A, and the participation reward B is given to the user B. In addition, in this case, the compensation target rewards when early defeat has occurred are participation rewards defined in association with the next and subsequent dates after the day when the early defeat has occurred.

The above exemplary embodiment has shown the example in which the participation rewards for which all the users have lost occasions to be given them because of early defeat are regarded as compensation target rewards. In another exemplary embodiment, only some of such participation rewards, instead of all of them, may be regarded as compensation target rewards. For example, with reference to the above exemplary embodiment, even in a case where early defeat has occurred on the third day from the start of the event, only the participation reward E for the fifth time in total may be regarded as a compensation target reward.

The above exemplary embodiment has shown the example in which the participation reward for the day when early defeat has occurred is not regarded as a compensation target. In another exemplary embodiment, the participation reward for the day when early defeat has occurred may also be included as the compensation target reward. In this case, only the users who have not been given the participation reward for the day when the early defeat has occurred may be given this reward as a compensation target, so that the users who have already been given this reward will not be given again.

Further, regarding the compensation target rewards, not only the participation rewards for which all the users have lost occasions to be given them but also non-given rewards that have not been given on a user-by-user basis may be included as the compensation target rewards. For example, it is assumed that the user A has participated three times in total and have already been given the participation rewards A to C, and the user B has participated only once in total and has been given only the participation reward A. In this case, under the above exemplary embodiment, the participation rewards D and E for the fourth and fifth times are regarded as compensation targets, but without limitation thereto, in another exemplary embodiment, for the user B, the participation rewards B and C which are non-given participation rewards may be included as compensation targets. Further, in this case, only some of the non-given rewards, instead of all of them, may be given.

The above exemplary embodiment has shown the example in which the compensation target rewards are given also to the users who have not participated in the event. However, in another exemplary embodiment, a non-participant user who has never participated in the event may be excluded from targets to which the compensation target rewards are to be given. That is, the compensation target rewards may be given to only the users who have participated in the event at least once.

The main units for executing the above-described processes are not limited to the above configurations. For example, in the information processing system, the server-side system may be composed of a plurality of information processing apparatuses and the processes to be executed on the server side may be executed by the plurality of information processing apparatuses in a shared manner. In addition, for example, the data other than the terminal-side game program 501 and the operation data 505 may be stored in the server 101, and the information processing terminal 102 may access the server 101 to refer to the data, as necessary. In this case, for example, the information processing terminal 102 may send the operation data 505 indicating a user's operation to the server 101, the server 101 may execute various game processes accordingly, and the information processing terminal 102 may receive a result of the execution, and generate and display a game screen in which the execution result is reflected.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. An information processing system for holding a game event in a virtual game space of a video game in which multiple users participate, the processing system comprising a processor and a memory coupled thereto, the processor being configured to control the processing system to at least:
   receive, from different ones of a plurality of computing devices that are associated with different ones of the multiple users, game event data that indicates how a respective user has participated in the virtual game space for the video game for the game event;
   update an advancement status for the game event of the video game based on the game event data that has been received, the game event being held over a plurality of unit periods that are tracked for the video game;
   cause participation data to be communicated to the plurality of computing devices, the participation data including information about a plurality of participation rewards to be given based on participation by individual ones of the multiple users in the game event during different ones of the plurality of unit periods over which the game event is held, wherein each of the plurality of participation rewards are game elements that are usable within the video game by respective ones of the multiple users;
   in accordance with participation in the game event by a first user of the multiple users, give the first user one of the plurality of participation rewards that is associated with the unit period, of the plurality of unit periods, in which a timing of the participation by the first user is associated therewith;
   determine whether the game event satisfies a first ending condition or a second ending condition;
   determine that the first ending condition for the game event is satisfied and based thereon, end advancement of the game event; and
   when the first ending condition remains unsatisfied, determine that the second ending condition for the game event is satisfied and based thereon, give a second user at least one of the plurality of participation rewards that has not been given to the second user for the game event.

2. The information processing system according to claim 1, wherein a number of rewards given to the user of the plurality of participation rewards that has not been given to the second user for the game event is based on a number of elapsed unit period(s) of the game event.

3. The information processing system according to claim 1, wherein
   when the game event has ended without competition of all of the unit periods, the user is given, among non-given rewards, participation rewards that could not be given to the user even if the user participated in all the unit periods associated with the game event.

4. The information processing system according to claim 1, wherein
   at least one non-given reward(s) is given also to the user who uses an application in connection with the game event, wherein the user has never participated in the game event during a period in which the game event was held.

5. The information processing system according to claim 1, wherein
   the user is given participation rewards that are associated with the unit periods, wherein the participation rewards are based on a number of unit periods for which the user has participated in as part of the game event.

6. The processing system of claim 1, wherein the first ending condition is not based on participation in the game event by the multiple users.

7. The processing system of claim 1, wherein the second ending condition is based on participation in the game event by the multiple users.

8. The processing system of claim 1, wherein the first ending condition is set to occur irrespective of user participation.

9. The processing system of claim 1, wherein the first ending condition is having a threshold number of unit periods occur for the game event.

10. The processing system of claim 1, wherein the second ending condition is based on an attribute of a virtual game character reaching a value.

11. The processing system of claim 10, wherein how each one of the multiple users interacted with the virtual game character comprises the game event data that is used to indicate progress of the game event.

12. A non-transitory computer-readable storage medium having stored therein instructions to be executed by a processor of an information processing apparatus for providing a user with a game event that is held in a virtual game space of a video game in which multiple users participate, the instructions causing, when executed by the processor, the information processing apparatus to:
   receive, from different ones of a plurality of computing devices that are associated with different ones of the multiple users, game event data that indicates how a respective user has participated in the virtual game space for the video game for the game event;
   update an advancement status for the game event of the video game based on the game event data that has been received, the game event being held over a plurality of unit periods that are tracked for the video game;

cause participation data to be communicated to the plurality of computing devices, the participation data including information about a plurality of participation rewards to be given based on participation by individual ones of the multiple users in the game event during different ones of the plurality of unit periods over which the game event is held, wherein each of the plurality of participation rewards are game elements that are usable within the video game by respective ones of the multiple users;

in accordance with participation in the game event by a first user of the multiple users, give the first user one of the plurality of participation rewards that is associated with the unit period, of the plurality of unit periods, in which a timing of the participation by the first user is associated therewith;

determine whether the game event satisfies a first ending condition or a second ending condition;

determine that the first ending condition for the game event is satisfied and based thereon, end advancement of the game event; and when the first ending condition remains unsatisfied, determine that the second ending condition for the game event is satisfied and based thereon, give a second user at least one of the plurality of participation rewards that has not been given to the second user for the game event.

13. An information processing apparatus for providing a user with a game event that is held in a virtual game space of a video game in which multiple users participate, the information processing apparatus comprising a processor and a memory coupled thereto, the processor being configured to control the information processing apparatus to at least:

receive, from different ones of a plurality of computing devices that are associated with different ones of the multiple users, game event data that indicates how a respective user has participated in the virtual game space for the video game for the game event;

update an advancement status for the game event of the video game based on the game event data that has been received, the game event being held over a plurality of unit periods that are tracked for the video game;

cause participation data to be communicated to the plurality of computing devices, the participation data including information about a plurality of participation rewards to be given based on participation by individual ones of the multiple users in the game event during different ones of the plurality of unit periods over which the game event is held, wherein each of the plurality of participation rewards are game elements that are usable within the video game by respective ones of the multiple users;

in accordance with participation in the game event by a first user of the multiple users, give the first user one of the plurality of participation rewards that is associated with the unit period, of the plurality of unit periods, in which a timing of the participation by the first user is associated therewith;

determine whether the game event satisfies a first ending condition or a second ending condition;

determine that the first ending condition for the game event is satisfied and based thereon, end advancement of the game event; and when the first ending condition remains unsatisfied, determine that the second ending condition for the game event is satisfied and based thereon, give a second user at least one of the plurality of participation rewards that has not been given to the second user for the game event.

14. An information processing method executed by a computer configured to control an information processing system for providing a user with a game event that is held in a virtual game space of a video game in which multiple users participate, the information processing method causing the information processing system to:

receive, from different ones of a plurality of computing devices that are associated with different ones of the multiple users, game event data that indicates how a respective user has participated in the virtual game space for the video game for the game event;

update an advancement status for the game event of the video game based on the game event data that has been received, the game event being held over a plurality of unit periods that are tracked for the video game;

cause participation data to be communicated to the plurality of computing devices, the participation data including information about a plurality of participation rewards to be given based on participation by individual ones of the multiple users in the game event during different ones of the plurality of unit periods over which the game event is held, wherein each of the plurality of participation rewards are game elements that are usable within the video game by respective ones of the multiple users;

in accordance with participation in the game event by a first user of the multiple users, give the first user one of the plurality of participation rewards that is associated with the unit period, of the plurality of unit periods, in which a timing of the participation by the first user is associated therewith;

determine whether the game event satisfies a first ending condition or a second ending condition;

determine that the first ending condition for the game event is satisfied and based thereon, end advancement of the game event; and when the first ending condition remains unsatisfied, determine that the second ending condition for the game event is satisfied and based thereon, give a second user at least one of the plurality of participation rewards that has not been given to the second user for the game event.

15. A computing system for providing a user with a game event in which multiple users participate, the game event held in a virtual game space of a video game, the game event held over a plurality of unit periods, the computing system comprising:

a processor and a memory coupled thereto, the processor being configured to, when computer executable instructions stored in the memory are executed, perform operations comprising:

receiving game event data, which is based on participation by different ones of the multiple users, that indicates how the game event has progressed;

obtaining participation data for a first user of the computer system regarding how the first user has participated in the virtual game space for the video game for the game event;

receiving and displaying an advancement status for the game event of the video game that is based on how the multiple users have participated in the game event, the game event being held over a plurality of unit periods that are tracked for the video game;

displaying participation data on a display that is coupled to the computing system, the participation data including information about a plurality of participation rewards to be given based on participation by the first user in the game event during different ones of the plurality of unit periods over which the game event is held, wherein each of the plurality of participation rewards are game elements that are usable within the video game by the first user;

based on participation in the game event by the first user of the multiple users, displaying that the first user has been given one of the plurality of participation rewards that is associated with the unit period, of the plurality of unit periods, in which a timing of the participation by the first user is associated therewith;

based on a determination that the game event satisfies a first ending condition or a second ending condition;

displaying that the first ending condition for the game event is satisfied and indicating that the game event has ended; and when the first ending condition remains unsatisfied, displaying that the second ending condition for the game event is satisfied and based thereon, displaying that the first user has been awarded at least one of the plurality of participation rewards that has not been given to the first user for the game event.

* * * * *